United States Patent
Utsumi et al.

(10) Patent No.: US 9,667,124 B2
(45) Date of Patent: May 30, 2017

(54) CONTROLLER-INTEGRATED ELECTRIC ROTATING MACHINE WITH BRUSH RESTRICTING ELEMENTS AND ASSEMBLING AND DISASSEMBLING METHODS OF THE SAME

(75) Inventors: Yoshinobu Utsumi, Chiyoda-ku (JP); Masahiko Fujita, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 377 days.

(21) Appl. No.: 14/122,734

(22) PCT Filed: Aug. 8, 2011

(86) PCT No.: PCT/JP2011/068043
§ 371 (c)(1),
(2), (4) Date: Nov. 27, 2013

(87) PCT Pub. No.: WO2013/021444
PCT Pub. Date: Feb. 14, 2013

(65) Prior Publication Data
US 2014/0091682 A1 Apr. 3, 2014

(51) Int. Cl.
*H02K 11/00* (2016.01)
*H02K 19/36* (2006.01)
(Continued)

(52) U.S. Cl.
CPC ......... *H02K 11/0073* (2013.01); *H02K 3/522* (2013.01); *H02K 5/10* (2013.01);
(Continued)

(58) Field of Classification Search
CPC ...... H02K 5/14; H02K 11/0073; H02K 11/33; H02K 11/046; H02K 3/522; H02K 5/10;
(Continued)

(56) References Cited

U.S. PATENT DOCUMENTS 3,219,860 A * 11/1965 Heiny .................... H02K 5/141
29/732
4,387,314 A * 6/1983 Iwaki .................... H02K 5/141
310/239
(Continued)

FOREIGN PATENT DOCUMENTS

JP 63-310349 * 12/1988
JP 02-007767 * 1/1990
(Continued)

OTHER PUBLICATIONS

JP02007767 English Translation.*
(Continued)

*Primary Examiner* — Michael Andrews
*Assistant Examiner* — Maged Almawri
(74) *Attorney, Agent, or Firm* — Sughrue Mion, PLLC; Richard C. Turner

(57) ABSTRACT

In a controller-integrated electric rotating machine configured to assemble a front side semi-manufactured assembly E formed from an electric rotating machine main body 1 and a front bracket 4 with the rear side semi-manufactured assembly D to which a rear bracket 5, a control unit assembly A, a power unit assembly B, and a brush unit assembly C are integrated, a series of brush restricting pin insertion holes 24 are disposed from a rear side end surface of the control unit assembly through the brush, and therefore assembling workability is improved without failures in assembling work which occur due to breaking away of a brush from a brush holder to the rotary shaft side.

16 Claims, 17 Drawing Sheets

(51) Int. Cl.
  *H02K 3/52* (2006.01)
  *H02K 5/22* (2006.01)
  *H02K 11/04* (2016.01)
  *H02K 5/10* (2006.01)
  *H02K 15/00* (2006.01)
  *H02K 15/14* (2006.01)
  *H02K 29/12* (2006.01)
  *H02K 5/14* (2006.01)
  *H02K 15/02* (2006.01)
  *H02K 11/33* (2016.01)

(52) U.S. Cl.
  CPC .......... *H02K 5/141* (2013.01); *H02K 5/225* (2013.01); *H02K 11/046* (2013.01); *H02K 11/33* (2016.01); *H02K 15/0006* (2013.01); *H02K 15/02* (2013.01); *H02K 15/14* (2013.01); *H02K 19/365* (2013.01); *H02K 29/12* (2013.01); *Y10T 29/49009* (2015.01)

(58) Field of Classification Search
  CPC ...... H02K 5/141; H02K 5/225; H02K 5/0006; H02K 5/02; H02K 19/365; H02K 19/12; H02K 310/239–310/248; H02K 310/219
  USPC ............ 310/219–252, 68 D, 156.66–156.73; 29/596
  See application file for complete search history.

(56) References Cited

U.S. PATENT DOCUMENTS

| | | | | |
|---|---|---|---|---|
| 4,855,631 A * | 8/1989 | Sato | ............ | H02K 5/148 310/239 |
| 5,245,241 A * | 9/1993 | Gotoh | ............ | H02K 5/141 310/239 |
| 5,708,352 A * | 1/1998 | Umeda | ............ | B60L 11/02 257/E29.104 |
| 6,215,211 B1 * | 4/2001 | Harris | ............ | H01R 39/38 310/239 |
| 7,224,078 B2 * | 5/2007 | Kato | ............ | F02N 11/04 290/31 |
| 7,498,701 B2 * | 3/2009 | Kikuchi | ............ | H02K 11/048 310/68 B |
| 7,570,488 B2 * | 8/2009 | Oohashi | ............ | H02K 11/046 310/60 R |
| 7,646,120 B2 * | 1/2010 | Nishimura | ............ | H02K 11/024 310/51 |
| 7,960,880 B2 * | 6/2011 | Hino | ............ | H02K 11/048 310/52 |
| 2001/0022477 A1 * | 9/2001 | Ishida | ............ | H01R 13/6272 310/89 |
| 2002/0140314 A1 * | 10/2002 | Tsuge | ............ | H02K 11/046 310/239 |
| 2003/0015928 A1 * | 1/2003 | Asao | ............ | H01L 25/115 310/68 D |
| 2003/0160534 A1 * | 8/2003 | Tsuge | ............ | H02K 5/141 310/239 |
| 2004/0027015 A1 * | 2/2004 | Utsumi | ............ | H02K 11/048 310/68 R |
| 2005/0077789 A1 * | 4/2005 | Kusumoto | ............ | G01P 3/44 310/68 B |
| 2006/0208581 A1 * | 9/2006 | Ikuta | ............ | H02K 5/18 310/58 |
| 2007/0046112 A1 * | 3/2007 | Uehara | ............ | H02K 5/20 310/58 |
| 2009/0243407 A1 * | 10/2009 | Kato | ............ | H02K 11/048 310/62 |
| 2009/0284106 A1 * | 11/2009 | Utsumi | ............ | H02K 5/20 310/68 R |
| 2010/0097053 A1 * | 4/2010 | Kikuchi | ............ | H02K 11/225 324/207.25 |
| 2010/0133961 A1 * | 6/2010 | Shirakata | ............ | H02K 11/022 310/68 B |
| 2010/0301692 A1 | 12/2010 | Shirakata et al. | | |
| 2010/0308700 A1 * | 12/2010 | Isoda | ............ | H02K 5/225 310/68 D |
| 2011/0187243 A1 * | 8/2011 | Oohashi | ............ | H02K 5/141 310/68 D |

FOREIGN PATENT DOCUMENTS

| | | | |
|---|---|---|---|
| JP | 02-07767 U | | 1/1990 |
| JP | 02007767 | * | 2/1990 |
| JP | 04-086075 U | | 7/1992 |
| JP | 2010-293727 A | | 10/2010 |
| JP | 2010-279137 A | | 12/2010 |

OTHER PUBLICATIONS

Communication dated Aug. 5, 2015 from the State Intellectual Property Office of the People's Republic of China in counterpart application No. 2011800727260.

Communication dated Mar. 9, 2016, from the State Intellectual Property Office of the People's Republic of China in counterpart application No. 201180072726.0.

Japanese Office Action, issued May 7, 2014 in Patent Application No. 2013-527767.

International Search Report of PCT/JP2011/068043 Dated Sep. 6, 2011.

Communication dated Sep. 1, 2016 from the State Intellectual Property Office of the P.R.C. in counterpart application No. 201180072726.0.

Communication, dated Jun. 20, 2016, from the European Patent Office, in counterpart European application No. 11870717.3.

* cited by examiner

CONTROLLER-INTEGRATED ELECTRIC ROTATING MACHINE WITH BRUSH RESTRICTING ELEMENTS AND ASSEMBLING AND DISASSEMBLING METHODS OF THE SAME

CROSS REFERENCE TO RELATED APPLICATIONS

This application is a National Stage of International Application No. PCT/JP2011/068043 filed Aug. 8, 2011, the contents of all of which are incorporated herein by reference in their entirety.

TECHNICAL FIELD

The present invention relates to a controller-integrated electric rotating machine, in which an electric rotating machine main body integrally includes a brush which energizes a rotator, a brush holder which holds the brush, a rotator energizing control unit which performs an energizing control on the rotor by being controlled by a control circuit, and a power circuit unit which performs a energizing control on a stator by being controlled by the control circuit, and assembling and disassembling methods of the same.

BACKGROUND ART

JP-A-2010-279137 (PTL 1) is an example in the related art.

PTL 1 discloses a controller-integrated electric rotating machine in which an electric rotating machine main body integrally includes a brush which energizes a rotator, a brush holder which holds the brush, a rotator energizing control unit which performs an energizing control on the rotor by being controlled by a control circuit, and a power circuit unit which performs a energizing control on a stator by being controlled by the control circuit.

CITATION LIST

Patent Literature

PLT 1: JP-A-2010-279137 (drawings and description in abstract)

SUMMARY OF INVENTION

Technical Problem

According to the above-described related art, during an assembling process and a disassembling process of a controller-integrated electric rotating machine, failures occur in the assembling work and the disassembling work due to a brush breaking away from a brush holder to a rotary shaft side.

The present invention is made in view of the above-described circumstances, and an object thereof is to improve assembling workability by preventing failures from occurring in the assembling work since the brush breaks away from the brush holder to the rotary shaft side.

Solution to Problem

A controller-integrated electric rotating machine according to the present invention includes: a rotor that is held by a rear bracket and a front bracket and positioned concentrically with a stator; a brush unit assembly that is an assembly of a brush energizing the rotor and a brush holder holding the brush; a power unit assembly configured to have a power unit case to which at least any one of a rotor energizing control unit which performs an energizing control on the rotor by being controlled and a power circuit unit which performs an energizing control on the stator by being controlled is attached; and a control unit assembly configured to have a control unit case to which a control board that mounts a control circuit performing the controls on the rotor energizing control unit and the power circuit unit by outputting a control signal to the rotor energizing control unit and the power circuit unit is attached. The control unit assembly is located at a rearmost side, the brush unit assembly is located at a frontmost side, and the power unit assembly is located between the control unit assembly and the brush unit assembly. The control unit assembly, the brush unit assembly and the power unit assembly are incorporated in the rear bracket, and the rear bracket, the control unit assembly, the power unit assembly, and the brush unit assembly are integrated to configure a rear side semi-manufactured assembly. The controller-integrated electric rotating machine is configured so that a front side semi-manufactured assembly formed from the rotor and the front bracket and the rear side semi-manufactured assembly are assembled. A series of brush restricting pin insertion holes are disposed from a rear side end surface of the control unit assembly through the brush. When assembling the front side semi-manufactured assembly with the rear side semi-manufactured assembly, it is possible to prevent the brush from breaking away from the brush holder to the rotary shaft, thereby improving assembling workability.

In addition, an assembling method of a controller-integrated electric rotating machine according to the present invention includes inserting a brush restricting pin to the series of brush restricting pin insertion holes in the rear side semi-manufactured assembly from a rear side end surface of the control unit assembly in the controller-integrated electric rotating machine; restricting the brush by using a front side end portion of the brush restricting pin so that the brush does not break away from the brush holder to the rotary shaft side; assembling the rear side semi-manufactured assembly with the front side semi-manufactured assembly; and then, removing the brush restricting pin from the series of brush restricting pin insertion holes. Therefore, when assembling the front side semi-manufactured assembly with the rear side semi-manufactured assembly, it is possible to prevent the brush from breaking away from the brush holder to the rotary shaft, thereby improving assembling workability.

In addition, there is provided a disassembling method of a controller-integrated electric rotating machine according to the present invention which includes a rotor that is held by a rear bracket and a front bracket and located concentrically with a stator; a brush unit assembly that is an assembly of a brush energizing the rotor and a brush holder holding the brush; a power unit assembly configured to have a power unit case to which at least any one of a rotor energizing control unit which performs an energizing control on the rotor by being controlled and a power circuit unit which performs an energizing control on the stator by being controlled is attached; and a control unit assembly configured to have a control unit case to which a control board that mounts a control circuit performing the controls on the rotor energizing control unit and the power circuit unit by outputting a control signal to the rotor energizing control unit and the power circuit unit is attached, and in which a sensor stator of a magnetic pole position detecting sensor is attached to the control unit case concentrically with a rotary shaft of the rotor, wherein a sensor rotor of the magnetic pole position detecting sensor is attached to a rear end side end portion of the rotary shaft concentrically with the sensor stator, wherein the control unit assembly is located at a rearmost side, the brush unit assembly is located at a frontmost side, and the power unit assembly is located between the control unit assembly and the brush unit assembly, respectively, wherein the control unit assembly, the brush unit assembly and the power unit assembly are incorporated in the rear bracket, and the rear bracket, the control unit assembly, the power unit assembly and the brush unit assembly are integrated to configure a rear side semi-manufactured assembly, wherein the controller-integrated electric rotating machine is configured so that a front side semi-manufactured assembly, formed from the rotor and the front bracket, and the rear side semi-manufactured assembly are assembled, and wherein a series of brush restricting pin insertion holes are disposed from a rear side end surface of the control unit assembly through the brush. The method includes detaching the sensor rotor from a rear side end portion of the rotary shaft after removing the control unit assembly from the controller-integrated electric rotating machine and then, detaching the front side semi-manufactured assembly from the rear side semi-manufactured assembly from which the control unit assembly is detached. Therefore, it is possible to easily and smoothly detach the front side semi-manufactured assembly from the rear side semi-manufactured assembly without the brush getting stuck in a groove between the rear side bearing and the sensor rotor, thereby improving disassembling workability.

Advantageous Effects of Invention

According to the present invention, a controller-integrated electric rotating machine includes a rotor that is held by a rear bracket and a front bracket and located concentrically with a stator; a brush unit assembly that is an assembly of a brush energizing the rotor and a brush holder holding the brush; a power unit assembly configured so that at least any one of a rotor energizing control unit which performs an energizing control on the rotor by being controlled and a power circuit unit which performs an energizing control on the stator by being controlled is attached to a power unit case; and a control unit assembly configured so that a control board that mounts a control circuit performing the controls on the rotor energizing control unit and the power circuit unit by outputting a control signal to the rotor energizing control unit and the power circuit unit is attached to a control unit case. The control unit assembly is located at a rearmost side, the brush unit assembly is located at a frontmost side, and the power unit assembly is located between the control unit assembly and the brush unit assembly, respectively. The control unit assembly, the brush unit assembly and the power unit assembly are incorporated in the rear bracket, and the rear bracket, the control unit assembly, the power unit assembly and the brush unit assembly are integrated to configure a rear side semi-manufactured assembly. The controller-integrated electric rotating machine is configured so that a front side semi-manufactured assembly formed from the rotor and the front bracket and the rear side semi-manufactured assembly are assembled. A series of brush restricting pin insertion holes are disposed from a rear side end surface of the control unit assembly through the brush. Therefore, when assembling the front side semi-manufactured assembly with the rear side semi-manufactured assembly, it is possible to prevent the brush from breaking away from the brush holder to the rotary shaft, thereby improving assembling workability.

According to the present invention, an assembling method includes inserting a brush restricting pin to the series of brush restricting pin insertion holes in the rear side semi-manufactured assembly from a rear side end surface of the control unit assembly in the controller-integrated electric rotating machine; restricting the brush by using a front side end portion of the brush restricting pin so that the brush does not break away from the brush holder to the rotary shaft side; assembling the rear side semi-manufactured assembly with the front side semi-manufactured assembly; and removing the brush restricting pin from the series of brush restricting pin insertion holes. Therefore, when assembling the front side semi-manufactured assembly with the rear side semi-manufactured assembly, it is possible to prevent the brush from breaking away from the brush holder to the rotary shaft, thereby improving assembling workability.

In addition, according to the present invention, there is provided a disassembling method of a controller-integrated electric rotating machine which includes a rotor that is held by a rear bracket and a front bracket and located concentrically with a stator; a brush unit assembly that is an assembly of a brush energizing the rotor and a brush holder holding the brush; a power unit assembly configured so that at least any one of a rotor energizing control unit which performs an energizing control on the rotor by being controlled and a power circuit unit which performs an energizing control on the stator by being controlled is attached to a power unit case; and a control unit assembly configured so that a control board that mounts a control circuit performing the controls on the rotor energizing control unit and the power circuit unit by outputting a control signal to the rotor energizing control unit and the power circuit unit is attached to a control unit case, and in which a sensor stator of a magnetic pole position detecting sensor is attached to the control unit case concentrically with a rotary shaft of the rotor, in which a sensor rotor of the magnetic pole position detecting sensor is attached to a rear side end portion of the rotary shaft concentrically with the sensor stator, wherein the control unit assembly is located at a rearmost side, the brush unit assembly is located at a frontmost side, and the power unit assembly is located between the control unit assembly and the brush unit assembly, respectively, and the control unit assembly, the brush unit assembly and the power unit assembly are incorporated in the rear bracket, and the rear bracket, the control unit assembly, the power unit assembly and the brush unit assembly are integrated to configure a rear side semi-manufactured assembly, in which the controller-integrated electric rotating machine is configured so that a front side semi-manufactured assembly formed from the rotor and the front bracket, and the rear side semi-manufactured assembly are assembled, and in which a series of brush restricting pin insertion holes are disposed from a rear side end surface of the control unit assembly through the brush. The method includes detaching the sensor rotor from a rear side end portion of the rotary shaft after removing the control unit assembly from the controller-integrated electric rotating machine; and detaching the front side semi-manufactured assembly from the rear side semi-manufactured assembly from which the control unit assembly is detached. Therefore, when disassembling the front side semi-manufactured assembly and the rear side semi-manufactured assembly, it is possible to prevent the brush from getting stuck in between the sensor rotor of the magnetic pole position detecting sensor and the rear side bearing, thereby providing an advantageous effect in improving disassembling workability.

BRIEF DESCRIPTION OF DRAWINGS

FIG. 14(a) is a cross-sectional view illustrating an overall structure of a controller-integrated electric rotating machine, FIG. 14(b) is a cross-sectional view illustrating an enlarged F portion in FIG. 14(a), and FIG. 14(c) is a view where the F portion in FIG. 14(b) is viewed from the rear side.

DESCRIPTION OF EMBODIMENTS

First Embodiment

Figure 1:
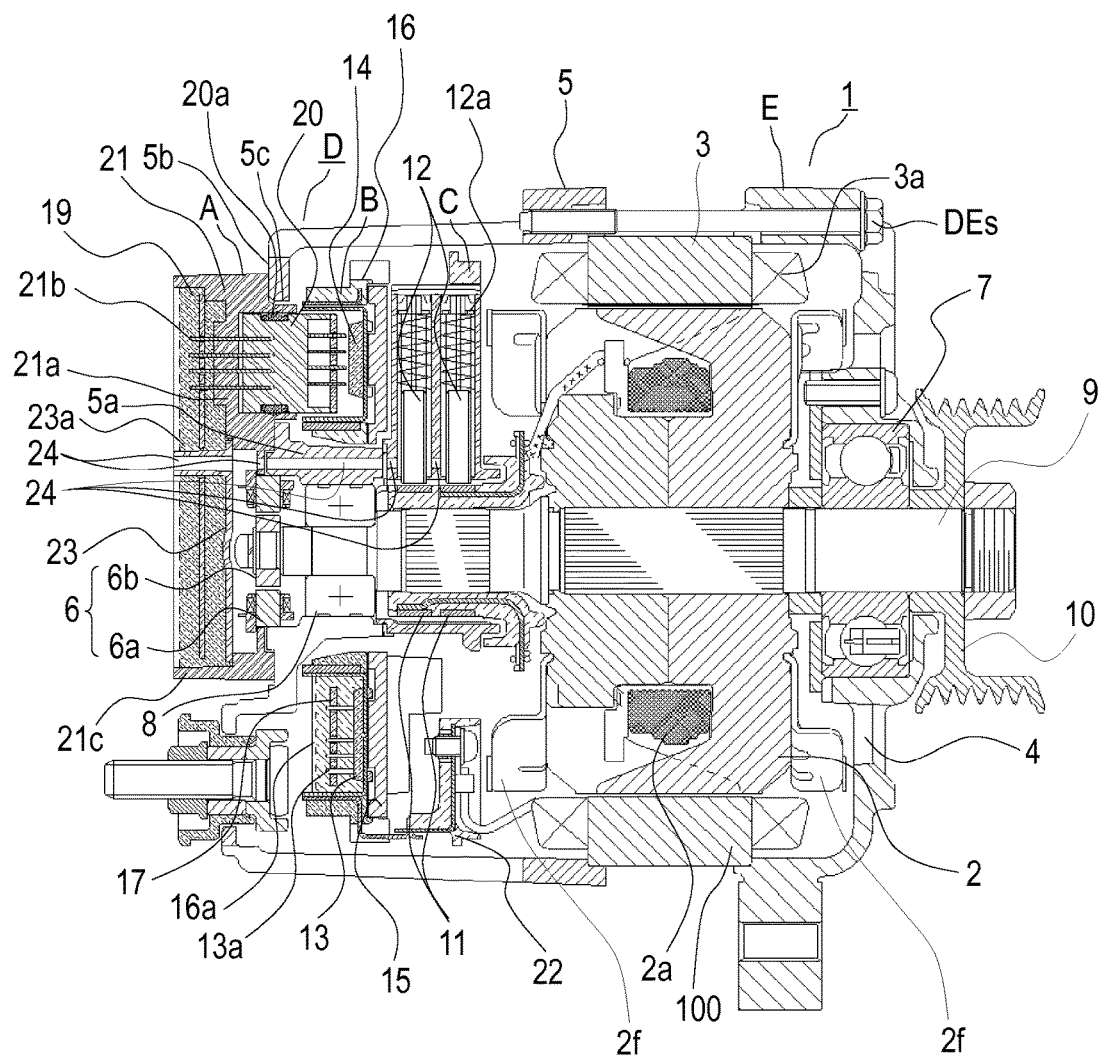
FIG. 1 illustrates a first embodiment of the present invention and is a cross-sectional view illustrating an overall structure of a controller-integrated electric rotating machine.
Figure 2:
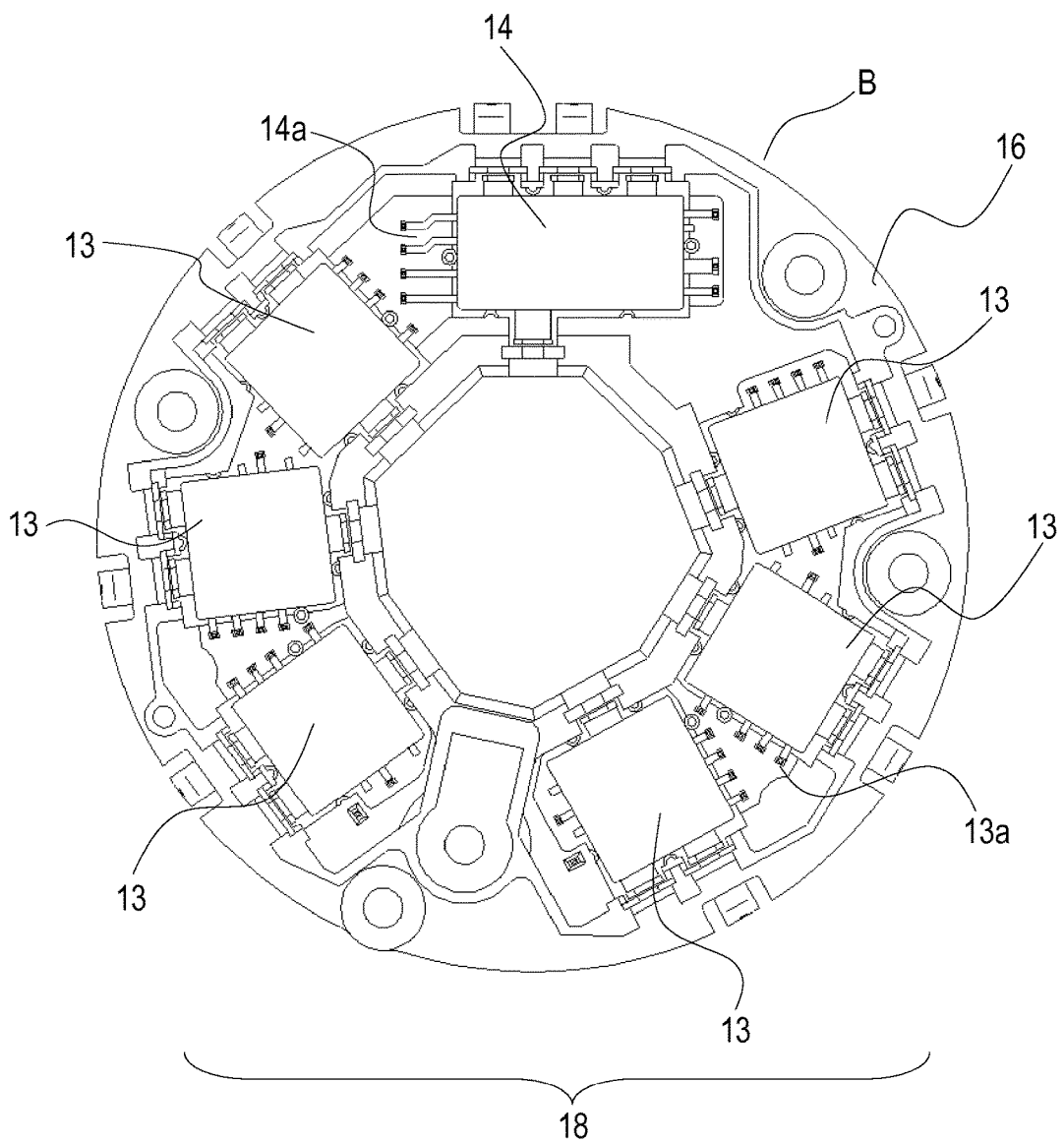
FIG. 2 illustrates the first embodiment of the present invention, and is a top view illustrating a state before a power unit assembly in which a power circuit unit performing an energizing control on a stator and a rotor energizing control unit performing an energizing control on a rotor are mounted on a heat sink is mounted on a relay board.
Figure 3:
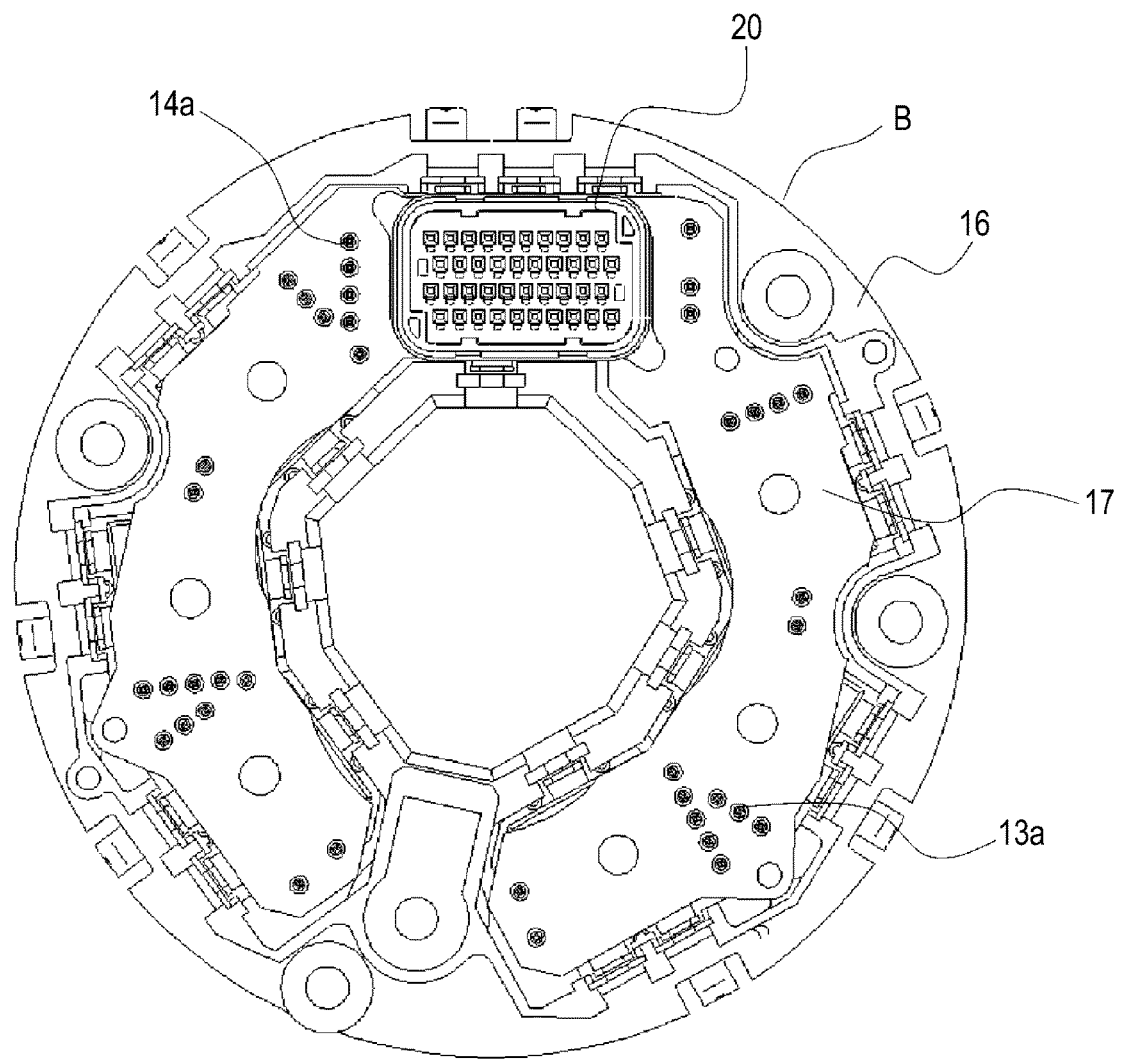
FIG. 3 illustrates a first embodiment of the present invention, and is a top view illustrating a state after a power unit assembly in which a power circuit unit performing an energizing control on a stator and a rotor energizing control unit performing an energizing control on a rotor are mounted on a heat sink is mounted on a relay board.
Figure 4:
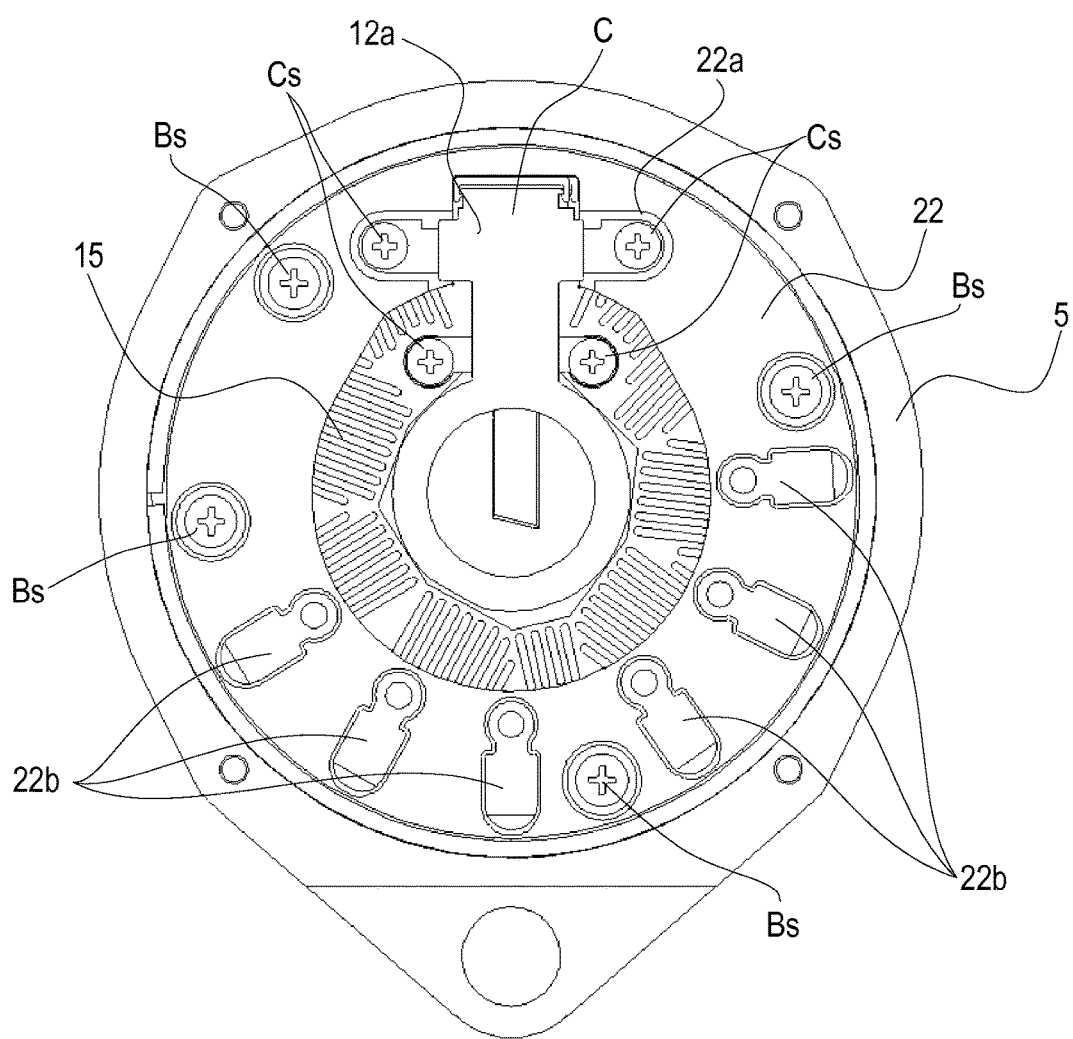
FIG. 4 illustrates a first embodiment of the present invention, and is a view illustrating positions of a wiring member inside a rear bracket and a brush holder when viewed from a stator side (front side).
Figure 5:
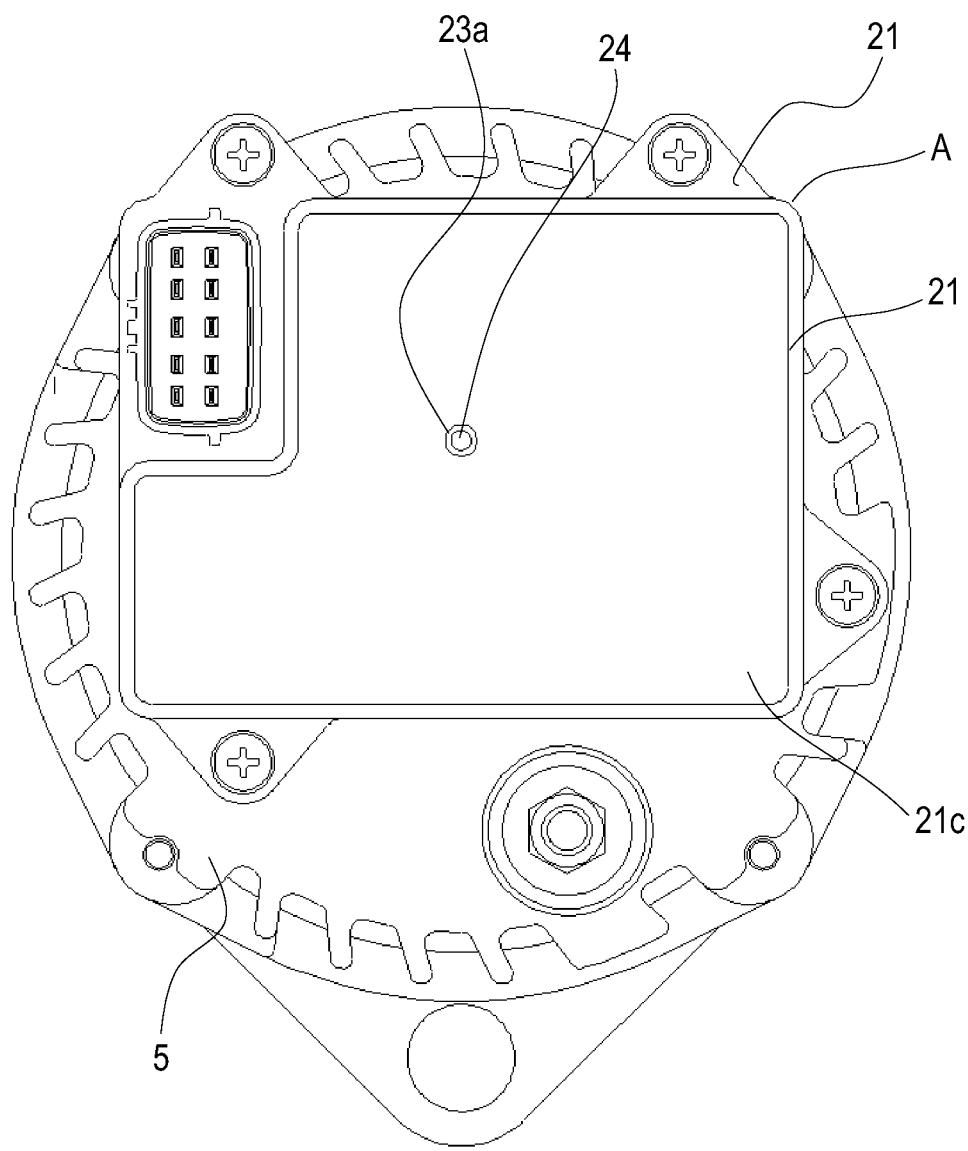
FIG. 5 illustrates a first embodiment of the present invention, and is a view where the controller-integrated electric rotating machine in FIG. 1 is viewed from the rear side.
Figure 6:
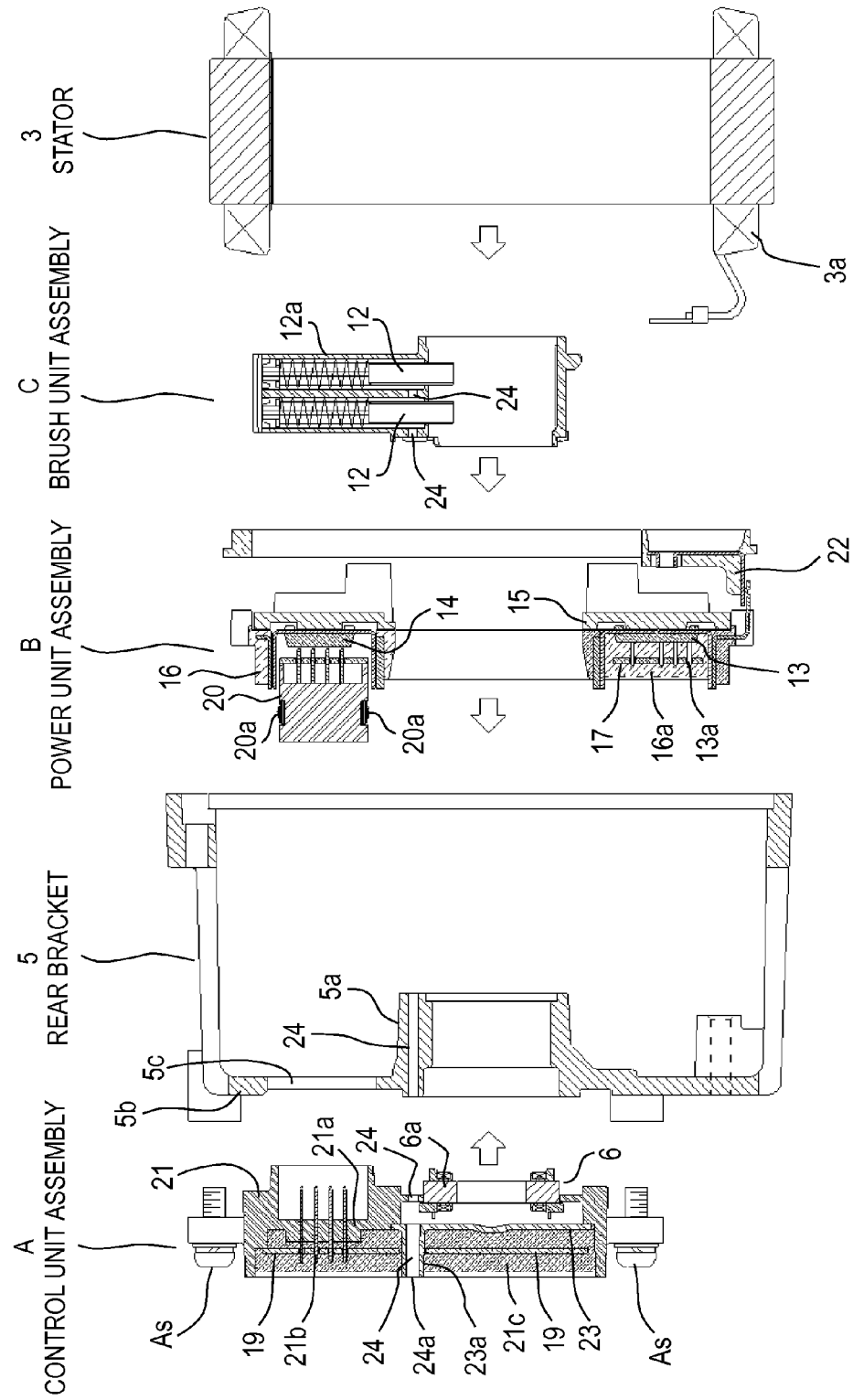
FIG. 6 illustrates a first embodiment of the present invention, is a view for explaining assembling of a rear side semi-manufactured assembly D, and is a view illustrating a state before a control unit assembly A, a power unit assembly B, a brush unit assembly C, and a stator 3 are assembled.
Figure 7:
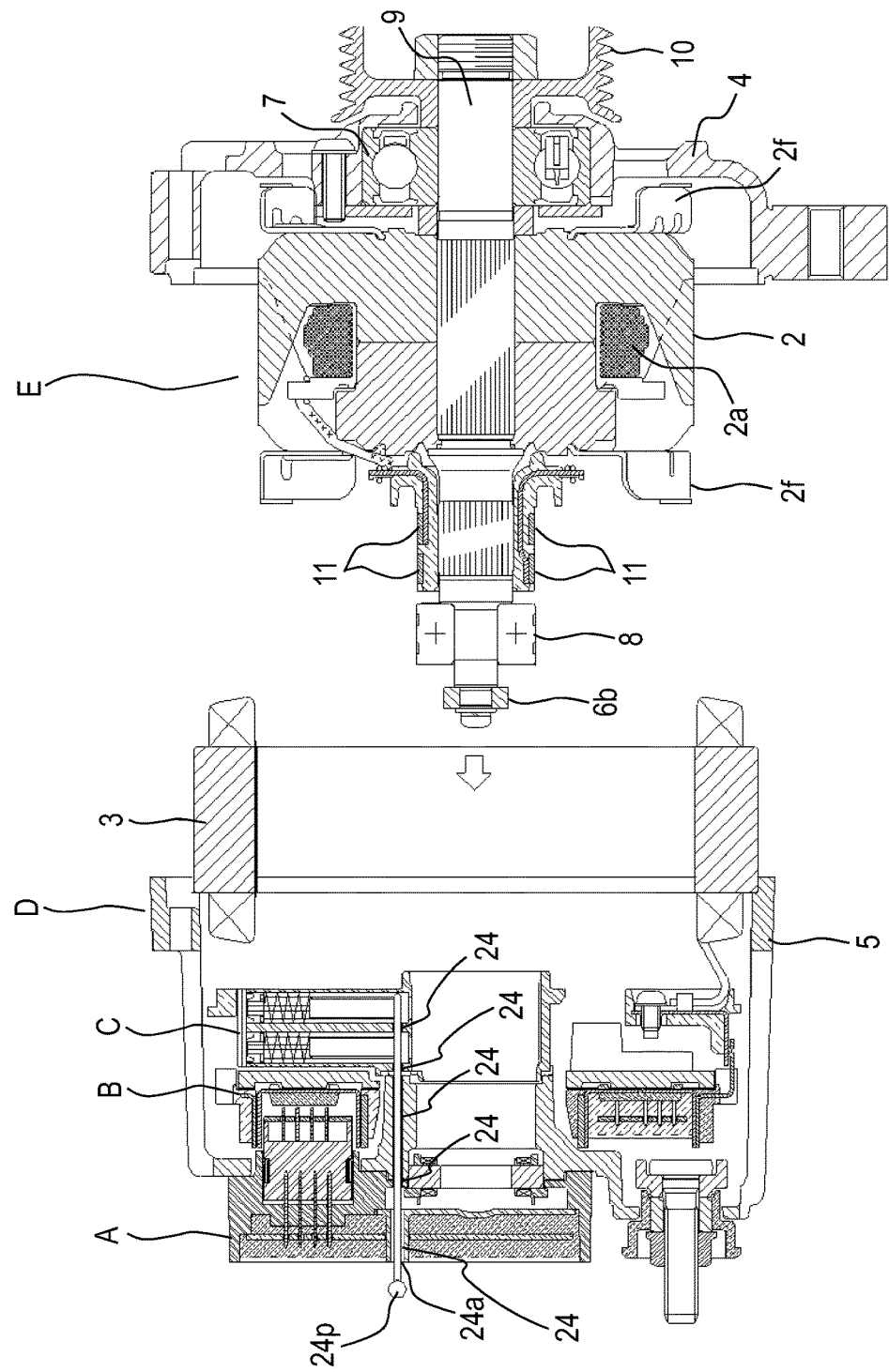
FIG. 7 illustrates a first embodiment of the present invention, is a view for explaining assembling of a rear side semi-manufactured assembly D with a front side semi-manufactured assembly E, and is a view illustrating a state before the rear side semi-manufactured assembly D and the front side semi-manufactured assembly E are assembled.
Figure 8:
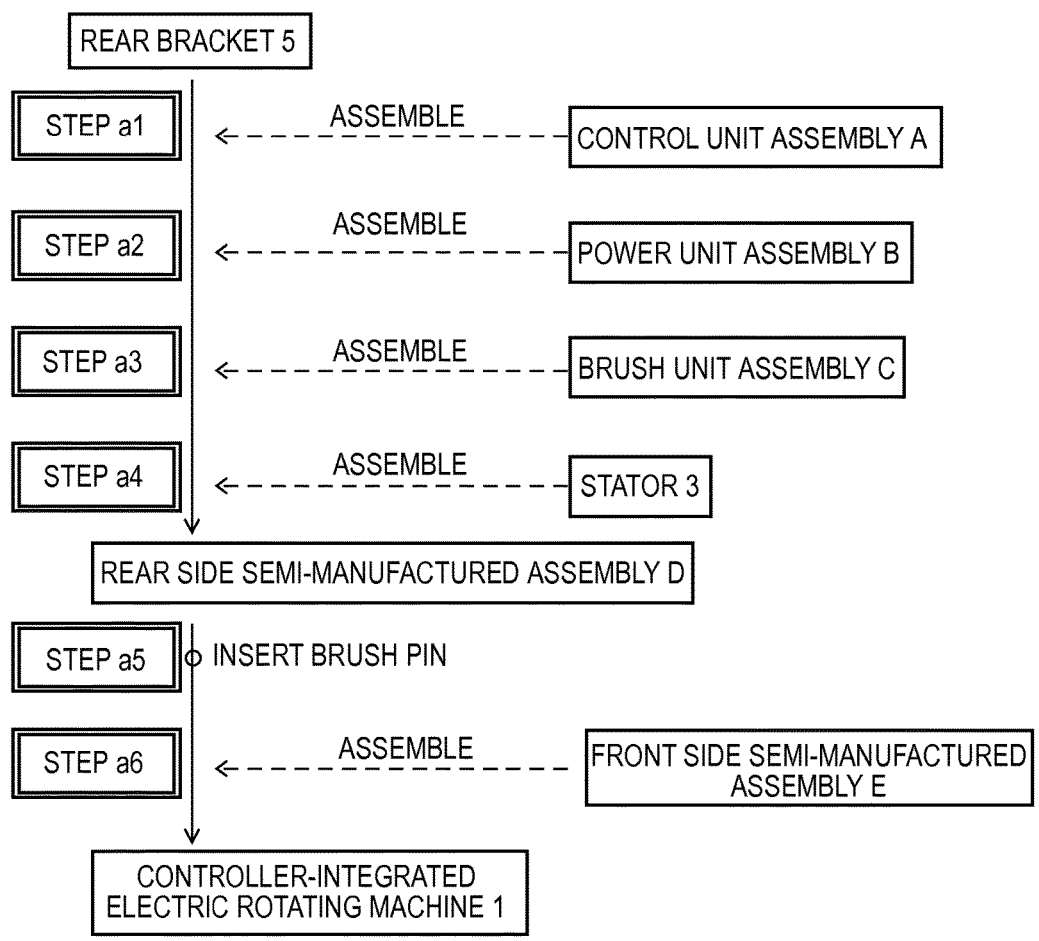
FIG. 8 illustrates a first embodiment of the present invention, and is a view illustrating an assembling process of a controller-integrated electric rotating machine 1.
Figure 9:
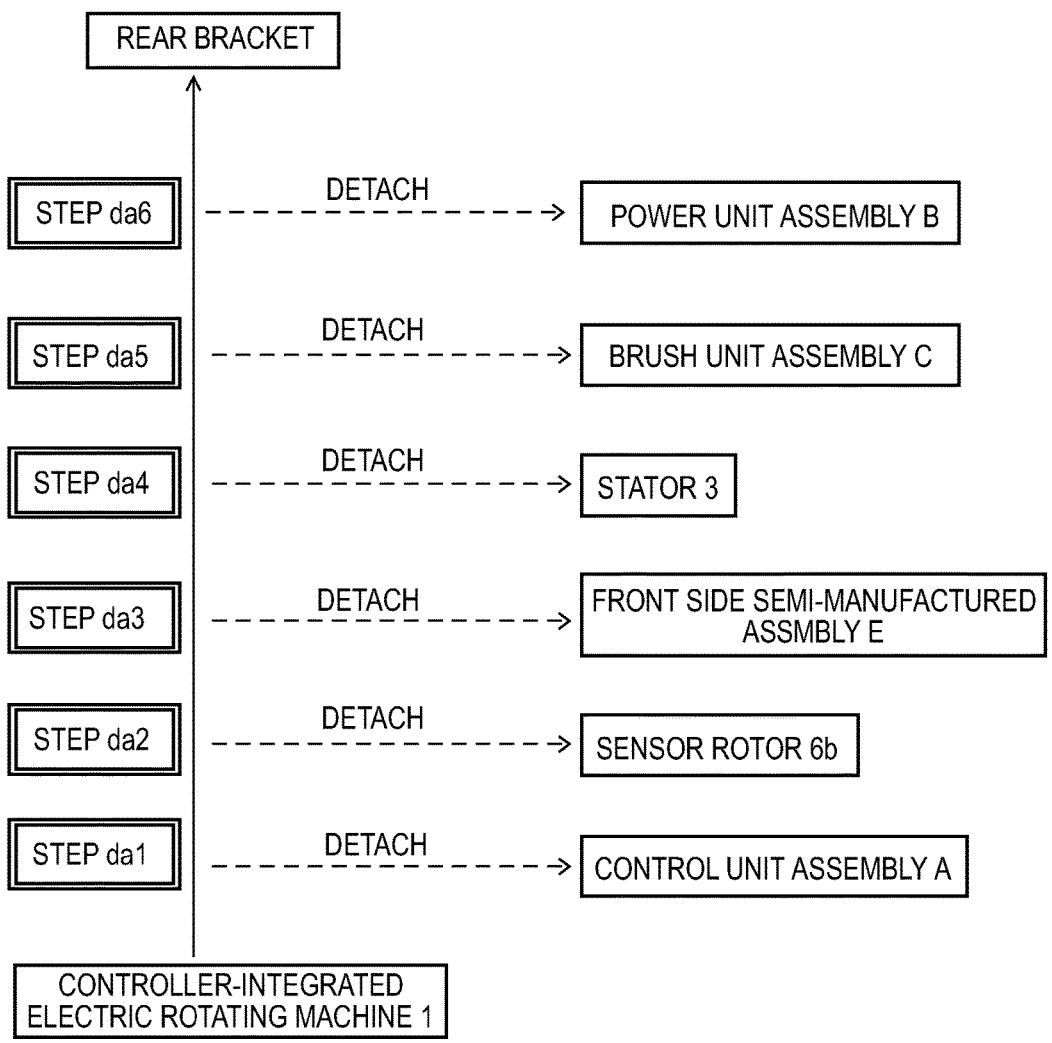
FIG. 9 illustrates a first embodiment of the present invention, and is a view illustrating a disassembling process of a controller-integrated electric rotating machine 1.
Figure 18:
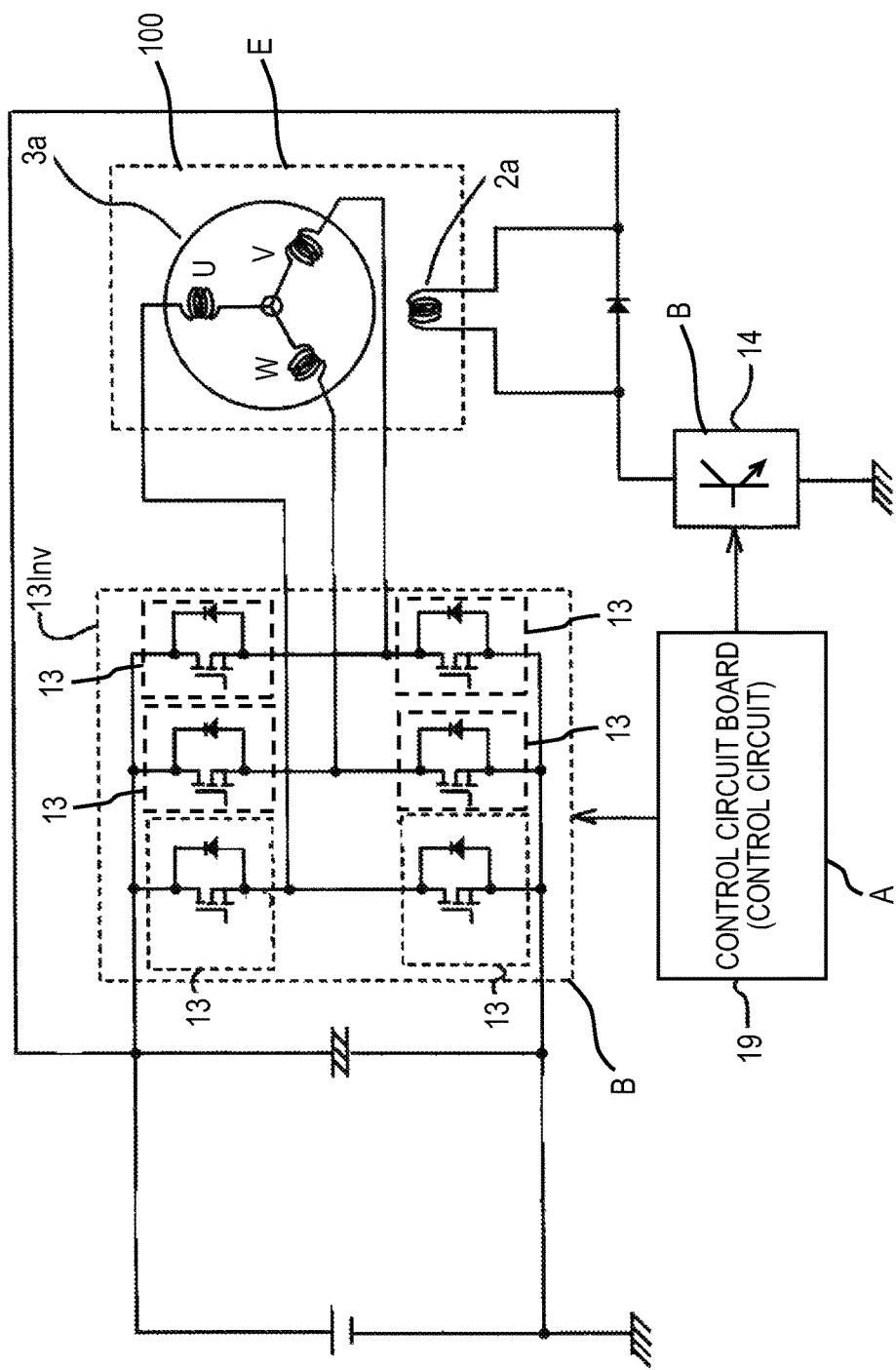
FIG. 18 is a view illustrating a schematic electrical circuit inside controller-integrated electric rotating machines according to first to eighth embodiments of the present invention.

Hereinafter, a first embodiment of the present invention will be described with reference to FIGS. 1 to 9 and 18. FIG. 1 is a cross-sectional view illustrating an overall structure of a controller-integrated electric rotating machine. FIG. 2 is a top view illustrating a state before a power unit assembly in which a power circuit unit performing an energizing control on a stator and a rotor energizing control unit performing an energizing control on a rotor are mounted on a heat sink is mounted on a relay board. FIG. 3 is a top view illustrating a state after the power unit assembly in which the power circuit unit performing the energizing control on the stator and the rotor energizing control unit performing the energizing control on the rotor are mounted on the heat sink is mounted on the relay board. FIG. 4 is a view illustrating positions of a wiring member inside a rear bracket and a brush holder when viewed from the stator side (front side). FIG. 5 is a view where the controller-integrated electric rotating machine in FIG. 1 is viewed from the rear side. FIG. 6 is a view for explaining assembling of a rear side semi-manufactured assembly D, illustrating a state before a control unit assembly A, a power unit assembly B, a brush unit assembly C, and a stator 3 are assembled. FIG. 7 is a view for explaining assembling of the rear side semi-manufactured assembly D with a front side semi-manufactured assembly E, illustrating a state before the rear side semi-manufactured assembly D and the front side semi-manufactured assembly E are assembled. FIG. 8 is a view illustrating an assembling process of a controller-integrated electric rotating machine 1. FIG. 9 is a view illustrating a disassembling process of the controller-integrated electric rotating machine 1. FIG. 18 is a view illustrating a schematic electrical circuit inside the controller-integrated electric rotating machine.

In FIGS. 1 to 7, the controller-integrated electric rotating machine 1 is configured by assembling the front side semi-manufactured assembly (in other words, a load side semi-manufactured assembly) E with the rear side semi-manufactured assembly (in other words, a non-load side semi-manufactured assembly) D.

The rear side semi-manufactured assembly D is configured by assembling a control unit assembly A, a power unit assembly B, a brush unit assembly C, and a stator 3 with a rear bracket 5.

The control unit assembly A is configured to include a control board 19 on which a control circuit (not illustrated) is mounted, a control unit case 21 formed from a mold case, an M connector portion 21a which is a male connector of the control unit assembly A side (hereinafter, referred to as an M connector), a terminal 21b of the control unit assembly A side which is connected to the control circuit on the control board 19, a resin 21c for molding the control board 19 with a terminal 21b of the control unit assembly A side, a magnetic pole position detecting sensor side cover 23, and a sensor stator 6a of a magnetic pole position detecting sensor (also known as a "resolver") 6.

The power unit assembly B is configured to include a power circuit 13 performing an energizing control on three-phase stator winding (armature winding) 3a of a stator 3 based on a control signal from the control circuit on the control board 19, a power circuit signal terminal 13a transferring the control signal from the control circuit on the control board 19 to the power circuit 13, a rotor energizing control unit (field circuit) 14 performing the energizing control on rotor winding (field winding) 2a of a rotor 2 based on the control signal from the control circuit on the control board 19, a rotor energizing control unit signal terminal 14a transferring the control signal from the control circuit on the control board 19 to the rotor energizing control unit (field circuit) 14, a heat sink 15 radiating generated heat of the power circuit 13 and generated heat of the rotor energizing control unit (field circuit) 14, an F connector portion 20 which is a female connector of the power unit assembly B side, which is connected to the M connector 21a so as to be attachable and detachable (hereinafter, referred to as an F connector), a waterproofing packing 20a disposed on an outer periphery of the F connector 20, a power unit case 16, a relay board 17, and a resin 16a for molding the relay board 17, the power circuit signal terminal 13a, the power circuit 13, the rotor energizing control unit signal terminal 14a, and the rotor energizing control unit 14.

The power unit case 16 is a resin mold case for attaching the power circuit 13, the rotor energizing control unit 14, the heat sink 15, and the F connector 20.

The relay board 17 is a board for mounting an electrical circuit which connects the power circuit signal terminal 13a of the power circuit 13 and the rotor energizing control unit signal terminal 14a of the rotor energizing control unit 14 to the F connector 20.

The control signal from the control circuit on the control board 19 is supplied to the power circuit signal terminal 13a via the M connector 21a, the F connector 20, and the relay board 17. Accordingly, the power circuit 13 performs the energizing control on the three-phase stator winding 3a based on the control signal from the control circuit on the control board 19.

The control signal from the control circuit on the control board 19 is supplied to the rotor energizing control unit signal terminal 14a via the M connector 21a, the F connector 20, and the relay board 17. Accordingly, the rotor energizing control unit 14 performs the energizing control on the rotor winding (field winding) 2a based on the control signal from the control circuit on the control board 19.

The brush unit assembly C is configured to include a brush 12, a brush holder 12a accommodating and holding the brush 12, and a brush pressing spring 12b accommodated inside the brush holder 12a.

The brush pressing spring 12b is a compression spring for elastically pressing the brush 12 to a slip ring 11 in a rear side (non-load side) tip portion of a rotary shaft 9 of the front side semi-manufactured assembly E.

The front side semi-manufactured assembly E is configured to include the rotor 2, the rotor winding (field winding) 2a, cooling fans 2f attached to each of the front side and the rear side of the rotor 2, a front bracket (load side bracket) 4, a sensor rotor 6b of a magnetic pole position detecting sensor 6, a front side bearing (load side bearing) 7, a rear side bearing (non-load side bearing) 8, a rotary shaft 9, a pulley 10 for coupling the rotary shaft 9 with a load such as an engine, and a slip ring 11 which comes into sliding contact with the brush 12 and supplies power to the rotor winding (field winding) 2a.

The controller-integrated electric rotating machine 1 is configured to include the rotor 2 around which field winding 2a of the rotor winding is wound, the stator 3 around which armature winding 3a of the three-phase stator winding is wound, the front bracket 4 which is the load side bracket accommodating the rotor 2 and the stator 3, the rear bracket 5 which is the non-load side bracket, the magnetic pole position detecting sensor 6 detecting a rotation state of the rotor 2, an electronic module 18 for supplying the power, and the control unit case 21 which is the mold case for mounting a control circuit board 19 having a control circuit for controlling the electronic module 18.

In the present embodiment, the electronic module 18 collectively includes six power circuits 13 configuring a power circuit unit 13Inv formed from a three-phase inverter (three-phase bridge power converter) supplying three-phase AC power to the armature winding 3a which are the three-phase stator winding of the stator 3 and includes the rotor energizing control unit (field circuit) 14 which controls the energizing of the field winding 2a of the rotor 2 (rotor winding) by using a switching element.

The magnetic pole position detecting sensor 6 is configured to have a sensor stator 6a and a sensor rotor 6b and to have the sensor rotor 6b having a core only is rotatably disposed inside the sensor stator 6a. The sensor rotor 6b is attached to the rotary shaft 9. The magnetic pole position detecting sensor 6 arranged outside of the rear side of the rear bracket 5 is arranged coaxially with the rotary shaft 9 and detects a magnetic pole position of the rotary shaft 9, that is, the rotor 2.

The rotor 2 includes the rotary shaft 9, both end portions of which are respectively and rotatably supported by the front bracket 4 and the rear bracket 5 via the front side bearing (load side bearing) 7 and the rear side bearing (non-load side bearing) 8. One end portion (load side end portion) of the rotary shaft 9 protrudes to the further front side (load side) than the front bracket 4, and the pulley 10 is fixed to the tip portion thereof. In addition, two slip rings 11 are assembled with the other end portion (non-load side end portion) of the rotary shaft 9. The brush 12 which comes into sliding contact with the slip rings 11 are held by the brush holder 12a and disposed inside the rear bracket 5.

Next, the electronic module 18 will be described. In FIG. 2, six power circuits 13 for supplying AC power to the stator winding 3a and the rotor energizing control unit (field winding) 14 for supplying current power to the field winding 2a are joined on the same plane of the disc-like heat sink 15. A cooling fin is arranged on the rear surface side of the heat sink 15. The power circuit signal terminal 13a and the rotor energizing control unit signal terminal 14a are insert-molded in each power circuit 13 and the field circuit unit 14 which are joined on the heat sink 15.

It is necessary to connect each of the signal terminals 13a and 14a of each power circuit 13 and the rotor energizing control unit (field circuit) 14 with the control board 19 which is located outside of the rear side of the rear bracket 5. However, the signal terminals 13a and 14a are arranged so that the positions thereof are scattered inside the electronic module 18. Thus, in such a state, it is difficult to connect the signal terminals with the control board 19. Therefore, as illustrated in FIG. 3, the relay board 17 is used. The signal terminals 13a and 14a scattered inside the electronic module 18 are aggregated by the relay board 17 and then are connected to the control board 19 by using the F connector 20.

The electronic module 18 sealed with the resin 16a is configured inside the power unit case 16.

FIG. 4 illustrates a wiring member 22 inside the rear bracket 5 when viewed from the stator 3 side, and the brush holder 12a is fixed to a rear surface of the rotor energizing control unit (field circuit) 14 inside the heat sink 15. The heat sink 15 is recessed to accommodate the brush holder 12a around the fixed portion. The brush holder 12a is assembled after the electronic module 18 is assembled. The rotor energizing control unit (field circuit) 14 and the brush holder 12a are connected to each other by a terminal 22a which is inserted to the wiring member 22. In addition, three-phase stator wiring (armature wiring) and the electronic module 18 are connected to each other via a terminal 22b which is inserted to the wiring member 22.

A control unit case (hereinafter, referred to as a mold case) 21 is attached to a rearward side of the rear bracket 5. The control board 19 having a mounted microcomputer for controlling a motor is accommodated inside the mold case 21. The sensor stator 6a is integrally mounted on the mold case 21 by fitting or bonding.

A signal line of the sensor stator 6a is welded or soldered with a terminal (not illustrated) which is insert-molded with the mold case 21 and is connected to the control board 19.

The M connector 21a for being connected to the F connector 20 disposed on the relay board 17 is integrally molded with mold case 21. The terminal 21b of the M connector 21a is outsert-molded or insert-molded with the mold case 21.

The packing 20a is disposed in the F connector 20, and the F connector 20 has a waterproofing structure. After the sensor stator 6a, the magnetic pole position detecting sensor side cover 23 and the control board 19 are mounted on the mold case 21, the inside of the mold case 21 is filled with the resin 21c.

The F connector 20 and the M connector 21a are connected to each other through a connector through-hole 5c disposed in a rear bracket end plate portion 5b in the rear of the rear bracket 5.

The magnetic pole position detecting sensor side cover 23 of the control unit assembly A has a cylindrical portion 23a protruding rearward from the cover 23, and a through-hole 24 is disposed inside the cylindrical portion 23a. The control unit case (mold case) 21 of the control unit assembly A, the boss portion 5a of the rear bracket 5, and the brush holder 12a also have the through-hole 24 at the same position as the through-hole 24 of the cylindrical portion 23a. The through-hole 24 of the control unit case (mold case) 21 of the control unit assembly A, the through-hole 24 of the boss portion 5a of the rear bracket 5, and the through-hole 24 of the brush holder 12a form a series of brush restricting pin insertion holes 24 from the rear side end portion of the control unit assembly A through the brush.

The brush restricting pin for holding the brush 12 is inserted to the series of brush restricting pin insertion holes 24. The brush 12 is restricted by the front side end portion of the brush restricting pin so that the brush 12 does not break away from the brush holder 12a to the rotary shaft 9 side. In this state, the rear side semi-manufactured assembly (non-load side semi-manufactured assembly) D in a sub-assembled state where the rear bracket 5 is assembled with the control unit assembly A, the power unit assembly B, and the brush unit assembly C (assembly in which the brush holder 12a is assembled with the brush 12) is assembled with the front side semi-manufactured assembly (load side semi-manufactured assembly) E formed from an electric rotating machine main body 100 and the front bracket 4. Then, the controller-integrated electric rotating machine 1 is assembled to be a finished product.

Here, using FIGS. 4 and 6 to 9, an assembling method and a disassembling method of the controller-integrated electric rotating machine 1 will be described in detail.

First, using FIG. 8 and referring to FIGS. 4, 6 and 7, the assembling method of the controller-integrated electric rotating machine 1 will be described.

First, the rear bracket 5 is assembled with the control unit assembly A (Step a1).

In Step a1, the sensor stator 6a of the magnetic pole position detecting sensor 6 of the control unit assembly A is fitted to the boss portion 5a of the rear bracket 5. Then, the control unit case (mold case) 21 of the control unit assembly A is fastened with the rear bracket 5 by using a fastener As such as a bolt and a screw (refer to FIGS. 6 and 7).

After the sensor stator 6a is fitted to the boss portion 5a of the rear bracket 5, the control unit case (mold case) 21 is fastened with the rear bracket 5 by using the fastener As. In this manner, the sensor stator 6a is fixed in a correct position.

In addition, after the sensor stator 6a is fitted to the boss portion 5a of the rear bracket 5, if the control unit case (mold case) 21 is fastened with the rear bracket 5 by using the fastener As, the brush restricting pin insertion hole 24 of the cylindrical portion 23a of the magnetic pole position detecting sensor side cover 23, the brush restricting pin insertion hole 24 of the control unit case (mold case) 21, and the brush restricting pin insertion hole 24 of the boss portion 5a of the rear bracket 5 configure the series of brush restricting pin insertion holes 24.

Next, the rear bracket 5 assembled with the control unit assembly A in Step a1 is assembled with the power unit assembly B (Step a2)

In Step a2, the F connector (female connector of the power unit assembly B side) 20 of the power unit assembly B is inserted and connected to the M connector (male connector of the control unit assembly A side) 21a of the control unit assembly A assembled with the rear bracket 5 in Step a1. Then, the power unit assembly B is fastened with the rear bracket 5 by using a fastener Bs (refer to FIG. 4) such as a bolt and a screw (refer to FIGS. 6 and 7).

The F connector (female connector of the power unit assembly B side) 20 of the power unit assembly B is inserted and connected to the M connector (male connector of the control unit assembly A side) 21a of the control unit assembly A assembled with the rear bracket 5 in Step a1. Then, the power unit assembly B is fastened with the rear bracket 5 by using a fastener Bs (refer to FIG. 4) such as a bolt and a screw. In this manner, the M connector (male connector of the control unit assembly A side) 21a of the control unit assembly A and the F connector (female connector of the power unit assembly B side) 20 of the power unit assembly B are reliably connected to each other. Waterproofing is performed by the packing 20a between the outer periphery of the F connector (female connector of the power unit assembly B side) 20 of the power unit assembly B and the inner periphery of the M connector (male connector of the control unit assembly A side) 21a of the control unit assembly A, which corresponds to the outer periphery of the F connector 20.

Next, the rear bracket 5 assembled with the control unit assembly A and the power unit assembly B in Steps a1 and a2 is assembled with the brush unit assembly C (Step a3).

In Step a3, the brush unit assembly C is fastened with the rear bracket 5 assembled with the control unit assembly A and the power unit assembly B in Steps a1 and a2 by using a fastener Cs (refer to FIG. 4) such as a bolt and a screw (refer to FIGS. 6 and 7).

In Step a3, the rear bracket 5 assembled with the control unit assembly A and the power unit assembly B in Steps a1 and a2 is assembled with the brush unit assembly C. In this manner, the brush restricting pin insertion holes 24, 24 of the brush unit assembly C configure the series of brush restricting pin insertion holes 24, together with the brush restricting pin insertion hole 24 of the cylindrical portion 23a of the magnetic pole position detecting sensor side cover 23, the brush restricting pin insertion hole 24 of the control unit case (mold case) 21, and the brush restricting pin insertion hole 24 of the boss portion 5a of the rear bracket 5.

Next, the rear bracket 5 assembled with the control unit assembly A, the power unit assembly B, and the brush unit assembly C in Steps a1 to a3 is assembled with the stator 3 by fitting (Step a4).

Steps a1 to a4 described above allow the rear side semi-manufactured assembly (non-load side semi-manufactured assembly) D to be produced.

Next, the brush 12 in the rear side semi-manufactured assembly D assembled in Steps a1 to a4 described above is pressed against the brush pressing spring 12b in a direction away from the insertion portion of the rotary shaft 9 (upward in FIG. 7) by using an assembly worker's finger or a dedicated jig. In this pressed state, a brush restricting pin 24p is inserted from a rear side opening (non-load side opening) 24a of the series of brush restricting pin insertion holes 24 to the series of brush restricting pin insertion holes 24 which are formed from the brush restricting pin insertion hole 24 of the cylindrical portion 23a of the magnetic pole position detecting sensor side cover 23 in the rear side semi-manufactured assembly D assembled in Steps a1 to a4 described above through the brush restricting pin insertion holes 24, 24 of the brush unit assembly C. In this case, a portion corresponding to the brush 12 in the tip portion of the brush restricting pin 24p comes into contact with an end surface which comes into contact with the slip ring 11 of the brush 12. In this manner, a movement of the brush 12 in a direction of coming into contact with the slip ring 11 (direction closing toward the rotation center of the rotary shaft 9) is restricted by a biasing force of the brush pressing spring 12b (refer to FIG. 7) (Step a5).

Next, in a state where the movement of the brush 12 is restricted by the brush restricting pin 24p in Step a5, the rear side semi-manufactured assembly (non-load side semi-manufactured assembly) D is assembled with the front side semi-manufactured assembly (load side semi-manufactured assembly) E (refer to FIG. 7) assembled in a different assembling line. The front bracket (load side bracket) 4 and the rear bracket (non-load side bracket) 5 are fastened together by using a fastener DEs such as a bolt. In this manner, the rear side semi-manufactured assembly D and the front side semi-manufactured assembly E are integrally coupled. Accordingly, in this state, if the brush restricting pin 24p which has been inserted to the series of brush restricting pin insertion holes 24 is removed from the series of brush restricting pin insertion holes 24, the assembling of the controller-integrated electric rotating machine 1 (refer to FIG. 1) is completed (Step a6).

In a state of FIG. 1 where the rear side semi-manufactured assembly D and the front side semi-manufactured assembly E are integrally coupled and the assembling of the controller-integrated electric rotating machine 1 is completed, the rear side bearing (non-load side bearing) 8 is fixed so that the outer periphery thereof is fitted to the inner periphery of the boss portion 5a of the rear bracket (non-load side bracket) 5. The rotation center of the sensor rotor 6b of the magnetic pole position detecting sensor 6 is coincident with the center of the annular sensor stator 6a. The tip end surface of the brush 12 is in contact with the outer peripheral surface of the slip ring 11 with a predetermined contact pressure by the biasing force of the brush pressing spring (compression spring) 12b.

Next, a disassembling method of the controller-integrated electric rotating machine 1 assembled as described above will be described by using FIG. 9 with reference to FIG. 1.

In FIG. 1, the control unit assembly A is first detached from the controller-integrated electric rotating machine 1 (Step da1).

In Step da1, the faster As is loosened and detached. Next, the control unit assembly A is detached from the rear bracket 5. If the control unit assembly A is detached from the rear bracket 5, the sensor stator 6a of the magnetic pole position detecting sensor 6 is also detached together with the control unit assembly A. Thus, the sensor rotor 6b attached to the rear side tip portion of the rotary shaft 9 is exposed to the rear side opening of the boss portion 5a of the rear bracket 5.

Next, the sensor rotor 6b exposed to the rear side opening of the boss portion 5a of the rear bracket 5 is detached from the rear side tip portion of the rotary shaft 9 (Step da2).

Next, the front side semi-manufactured assembly E from which the sensor rotor 6b is detached is detached from the rear side semi-manufactured assembly D (Step da3).

In Step da3, along with the detachment of the front side semi-manufactured assembly E from the rear side semi-manufactured assembly D, the slip ring 11 and the rear side bearing 8 on the rotary shaft 9 of the front side semi-manufactured assembly E are also detached together from the rear side semi-manufactured assembly D. In this case, the brush 12 is biased in the direction of the rotary shaft 9 by the brush pressing spring 12b, and the brush restricting pin 24p is also removed from the series of brush restricting pin insertion holes 24 (Step a6). Accordingly, when the sensor rotor 6b is not detached from the rear side tip portion of the rotary shaft 9 and remains attached on the rotary shaft 9, the brush 12 gets stuck in the annular groove between the rear side bearing 8 and the sensor rotor 6b, thereby making it difficult to detach the front side semi-manufactured assembly E from the rear side semi-manufactured assembly D. However, since the sensor rotor 6b is detached from the rear side tip portion of the rotary shaft 9 in Step da2, the brush 12 does not get stuck in any portion. Therefore, the front side semi-manufactured assembly E can be easily and smoothly detached from the rear side semi-manufactured assembly D.

Next, the stator 3 is detached from the rear bracket 5 (Step da4) and subsequently the brush unit assembly C is detached from the rear bracket 5 (Step da5). Thereafter, the power unit assembly B is detached from the rear bracket 5 (Step da6). In this manner, the disassembling of the rear side semi-manufactured assembly D in units of assemblies A, B, and C is completed.

That is, in the assembling method, the controller-integrated electric rotating machine 1 is configured to include the rotor 2 that is held by the rear bracket 5 and the front bracket 4 and located concentrically with the stator 3; the brush unit assembly C that is an assembly of the brush 12 energizing the rotor 2 and the brush holder 12a holding the brush 12; the power unit assembly B configured to have the power unit case 16 to which at least any one of the rotor energizing control unit 14 which performs the energizing control on the rotor 2 by being controlled and the power circuit unit 13Inv which performs the energizing control on the stator 3 by being controlled is attached; and the control unit assembly A configured to have the control unit case 21 to which the control board 19 that mounts the control circuit performing the controls on the rotor energizing control unit 14 and the power circuit unit 13Inv by outputting a control signal to the rotor energizing control unit 14 and the power circuit unit 13Inv is attached. The control unit assembly A is located at a rearmost side, the brush unit assembly C is located at a frontmost side, and the power unit assembly B is located between the control unit assembly A and the brush unit assembly C, respectively. The control unit assembly A, the brush unit assembly C and the power unit assembly B are incorporated in the rear bracket 5, and the rear bracket 5, the control unit assembly A, the power unit assembly B and the brush unit assembly C are integrated to configure the rear side semi-manufactured assembly D. The controller-integrated electric rotating machine 1 is configured so that the front side semi-manufactured assembly E formed from the rotor 2 and the front bracket 4 and the rear side semi-manufactured assembly D are assembled. The series of brush restricting pin insertion holes 24 are disposed from the rear side end surface of the control unit assembly A through the brush 12. In the controller-integrated electric rotating machine 1 having such a configuration, the assembling method enables inserting the brush restricting pin 24p to the series of brush restricting pin insertion holes 24 from the rear side end surface of the control unit assembly A in the rear side semi-manufactured assembly D; restricting the brush 12 by using the front side end portion of the brush restricting pin 24p so that the brush 12 does not break away from the brush holder 12a to the rotary shaft side; assembling the rear side semi-manufactured assembly D with the front side semi-manufactured assembly E; and then removing the brush restricting pin 24p from the series of brush restricting pin insertion holes 24. Therefore, it is possible to assemble the controller-integrated electric rotating machine 1 without failures in the assembling work which occur since the brush 12 breaks away from the brush holder 12a to the rotary shaft 9 side, thereby improving assembling workability.

In addition, in the disassembling method, the controller-integrated electric rotating machine 1 is configured to include the rotor 2 that is held by the rear bracket 5 and the front bracket 4 and located concentrically with the stator 3; the brush unit assembly C that is an assembly of the brush 12 energizing the rotor 2 and the brush holder 12a holding the brush 12; the power unit assembly B configured to have the power unit case 16 to which at least any one of the rotor energizing control unit 14 which performs the energizing control on the rotor 2 by being controlled and the power circuit unit 13Inv which performs the energizing control on the stator 3 by being controlled is attached; and the control unit assembly A configured to have the control unit case 21 to which the control board 19 that mounts the control circuit performing the controls on the rotor energizing control unit 14 and the power circuit unit 13Inv by outputting a control signal to the rotor energizing control unit 14 and the power circuit unit 13Inv is attached. There is provided the control unit assembly A in which the sensor stator 6a of the magnetic pole position detecting sensor 6 is attached to the control unit case 21 concentrically with the rotary shaft 9 of the rotor 2. The sensor rotor 6b of the magnetic pole position detecting sensor 6 is attached to the rear side end portion of the rotary shaft 9 concentrically with the sensor stator 6a. The control unit assembly A is located at a rearmost side, the brush unit assembly C is located at a frontmost side, and the power unit assembly B is located between the control unit assembly A and the brush unit assembly C, respectively. The control unit assembly A, the brush unit assembly C and the power unit assembly B are incorporated in the rear bracket 5, and the rear bracket 5, the control unit assembly A, the power unit assembly B and the brush unit assembly C are integrated to configure the rear side semi-manufactured assembly D. The controller-integrated electric rotating machine 1 is configured so that the front side semi-manufactured assembly E formed from the rotor 2 and the front bracket 4 and the rear side semi-manufactured assembly D are assembled. The series of brush restricting pin insertion holes 24 are disposed from the rear side end surface of the control unit assembly A through the brush 12. In the controller-integrated electric rotating machine 1 having such a configuration, the disassembling method enables detaching the sensor rotor 6b from the rear side end portion of the rotary shaft 9 after removing the control unit assembly A from the controller-integrated electric rotating machine 1; and then, detaching the front side semi-manufactured assembly E from the rear side semi-manufactured assembly D from which the control unit assembly A is detached. Therefore, when disassembling the front side semi-manufactured assembly E and the rear side semi-manufactured assembly D, it is possible to prevent the brush 12 from getting stuck in between the sensor rotor 6b of the magnetic pole position detecting sensor 6 and the rear side bearing 8, thereby improving disassembling workability.

In addition, unlike the first embodiment, when the power unit assembly B is assembled with the rear bracket 5 earlier than the control unit assembly A, the sensor stator 6a of the control unit assembly A is fitted to the rear bracket 5, and the F connector 20 of the power unit assembly B is fitted to the M connector 21a of the control unit A. In this manner, two places are fitted, and two places need to be simultaneously fitted. Therefore, eccentricity of the connectors occurs between the F connector 20 and the M connector 21a.

In contrast, in the first embodiment, the control unit assembly A is first attached to the rear bracket 5, and then the power unit assembly B is attached to the rear bracket 5. Accordingly, the F connector 20 of the power unit assembly B is attached based on the earlier attached M connector 21a of the control unit assembly A, and then the power unit assembly B is attached to the rear bracket 5 by using the fastener Bs such as a bolt, which can be flexibly used in a positional point of view. Therefore, it is possible to eliminate the eccentric attachment of the connectors between the F connector 20 of the power unit assembly B and the M connector 21a of the control unit assembly A, thereby improving waterproofing property. In addition, a clearance can be decreased by fitting the sensor stator 6a and the rear bracket 5, thereby improving detection angle accuracy.

In addition, the power unit assembly B and the control unit assembly A are configured to have a sub-assembly (rear side semi-manufactured assembly (non-load side semi-manufactured assembly)). Therefore, the power circuit unit 13Inv configuring an inverter can be inspected in the sub-assembly state, thereby improving quality.

In addition, the power circuit unit 13Inv and the rotor energizing control unit (field winding) 14 are attached to the rear bracket 5, thereby preventing damage resulting from static electricity.

Second Embodiment

Figure 10:
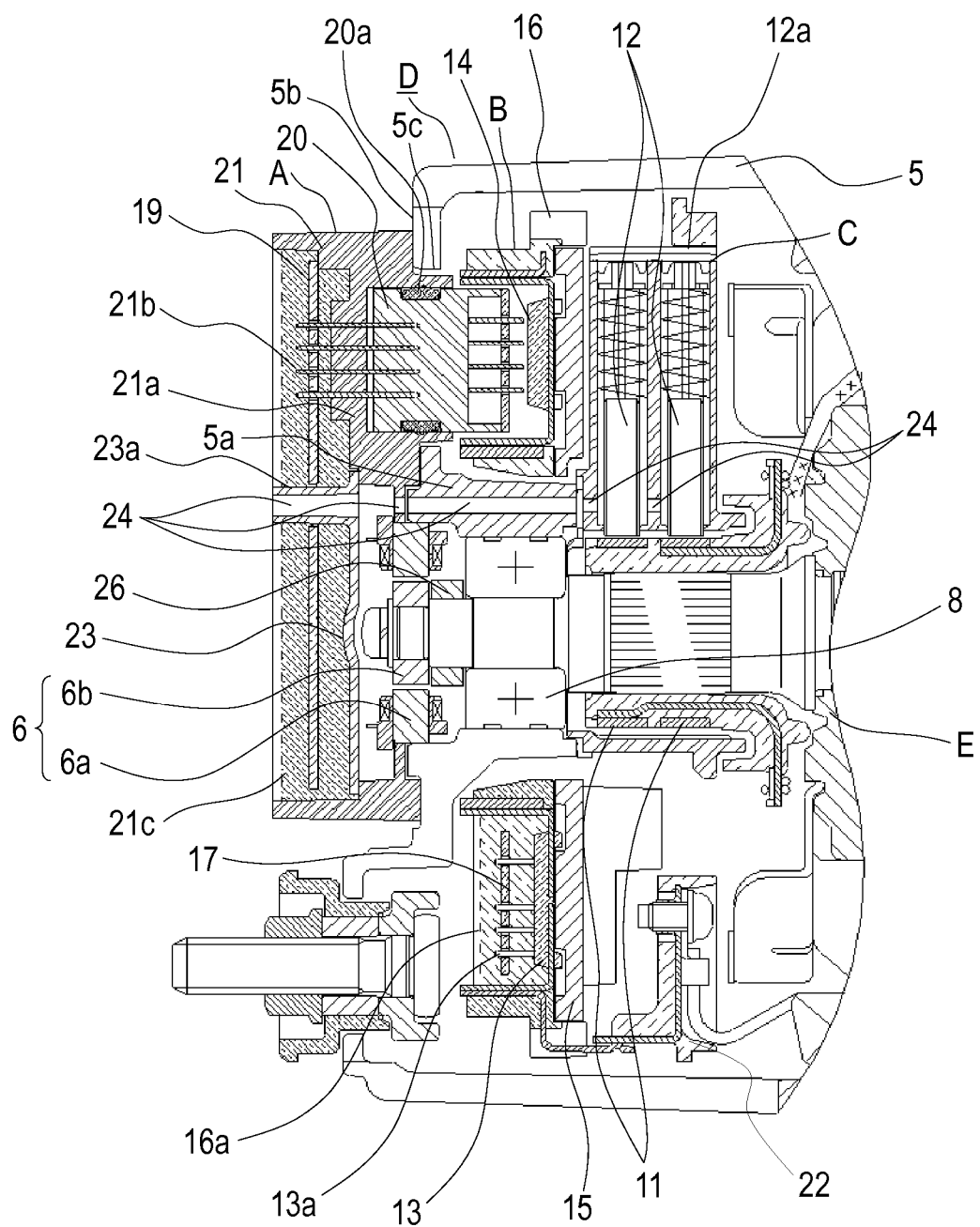
FIG. 10 illustrates a second embodiment of the present invention, and is a cross-sectional view illustrating a main portion of a controller-integrated electric rotating machine.

Hereinafter, a second embodiment of the present invention will be described with reference to FIG. 10. FIG. 10 is a cross-sectional view illustrating a main portion of a controller-integrated electric rotating machine. However, the same reference numerals are given to the configuring elements similar to the first embodiment, and since the basic configurations are the same as those of the first embodiment, the description will be omitted.

An annular brush disengagement prevention unit 26 is attached to the rotary shaft 9, in a press-fitted or shrinkage-fitted manner, at a position between the sensor rotor 6b fixed to the end portion of the rotary shaft 9 of the rotor 2 and the rear side bearing (non-load side bearing) 8.

According to the second embodiment, since the configuration is as described above, the brush 12 no longer gets stuck in between the sensor rotor 6b and the rear side bearing (non-load side bearing) 8 during the disassembling, thereby enabling easy disassembling work.

Third Embodiment

Figure 11:
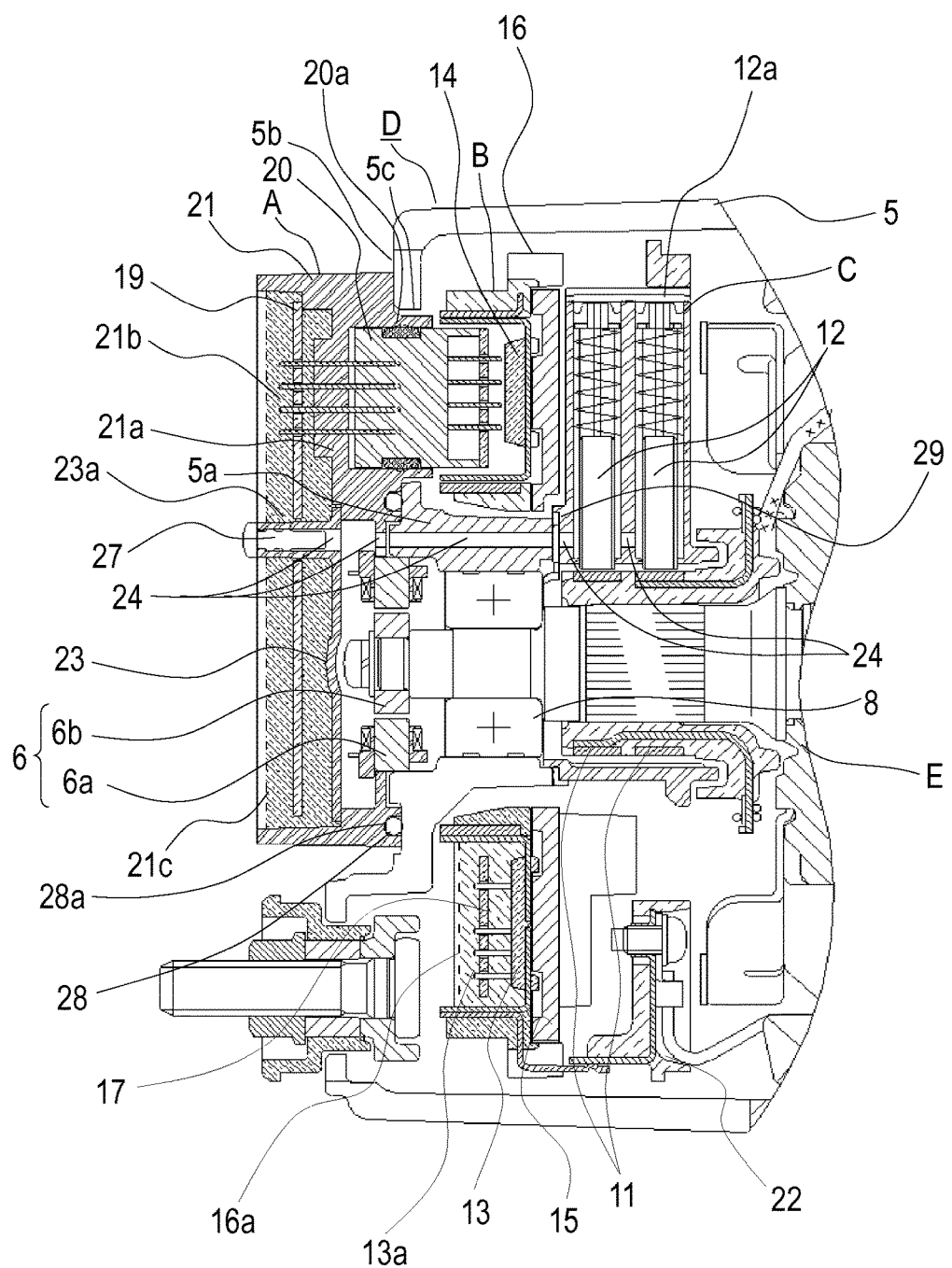
FIG. 11 illustrates a third embodiment of the present invention, and is a cross-sectional view illustrating a main portion of a controller-integrated electric rotating machine.

Hereinafter, a third embodiment of the present invention will be described with reference to FIG. 11. FIG. 11 is a cross-sectional view illustrating a main portion of a controller-integrated electric rotating machine. However, the same reference numerals are given to the configuring elements similar to the first embodiment, and since the basic configurations are the same as those of the first embodiment, the description will be omitted.

A waterproofing plug 27 formed of an elastic material such as rubber is disposed in the through-hole 24 which is disposed in the cylindrical portion 23a of the magnetic pole position detecting sensor side cover 23 arranged in the control unit case (mold case) 21. A groove 28a is disposed in the rear bracket (non-load side bracket) 5 side of the control unit case (mold case) 21. An O-ring 28 is arranged in the groove 28a. A packing 29, whose hole is closed if the brush restricting pin is removed by passing therethrough, is disposed in the rear bracket 5 side of the brush holder 12a.

According to the third embodiment, since the configuration is as described above, it is possible to reliably waterproof the magnetic pole position detecting sensor 6 by using the waterproofing plug 27, the O-ring 28, and the packing 29, thereby improving the waterproofing property. In addition, the waterproofing plug 27 is attachable and detachable, and can be assembled even disassembled for repairs.

In addition, the packing 29 is made of rubber and has a structure where the brush restricting pin closes the opened hole by using a reaction force of the rubber. Therefore, it is possible to simplify the shape of the packing, thereby enabling cost reduction.

Fourth Embodiment

Figure 12:
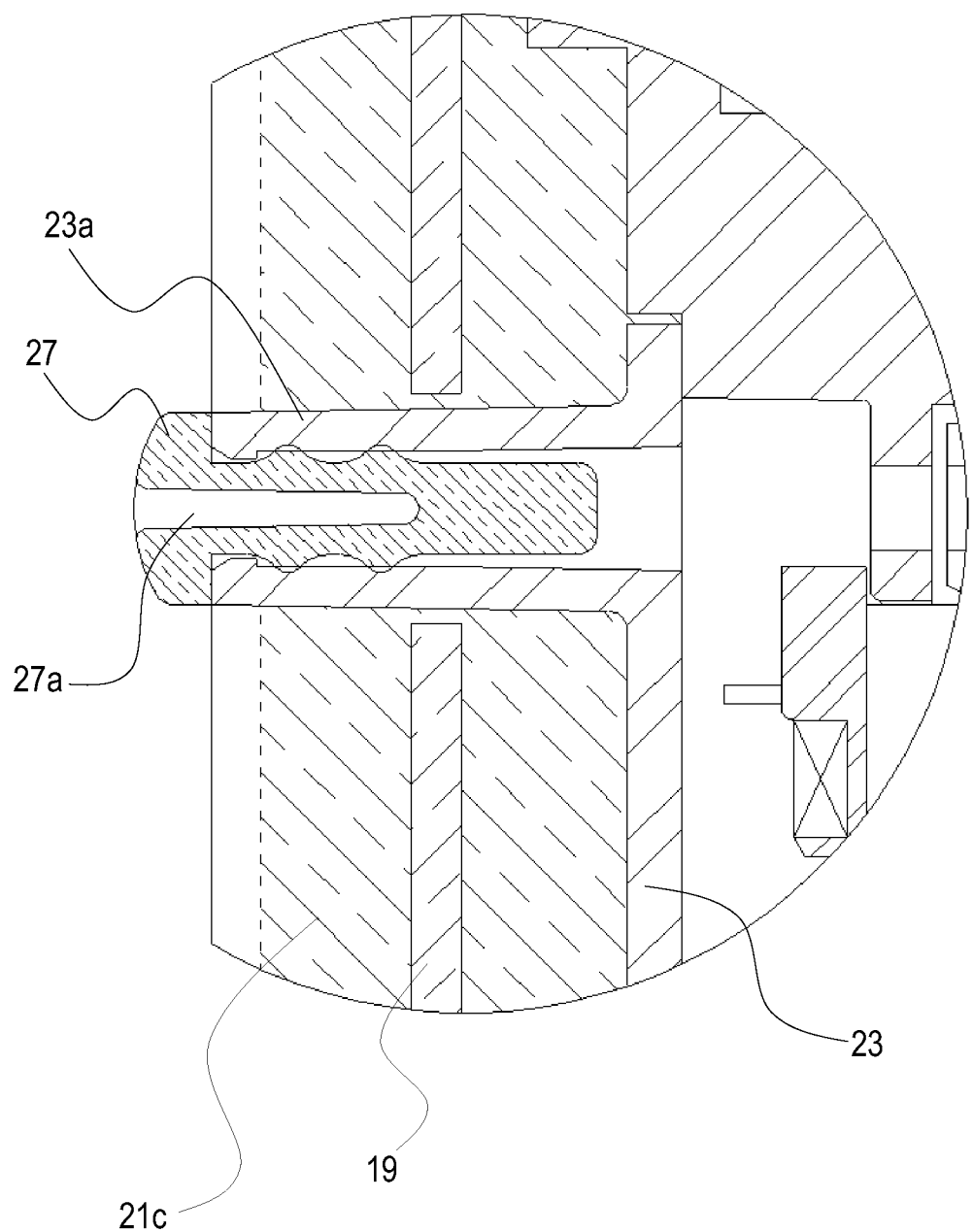
FIG. 12 illustrates a fourth embodiment of the present invention, and is a cross-sectional view illustrating an enlarged main portion.

Hereinafter, a fourth embodiment of the present invention will be described with reference to FIG. 12. FIG. 12 is a cross-sectional view illustrating an enlarged main portion.

The waterproofing plug 27 made of rubber is disposed in the through-hole 24 which is disposed in the cylindrical portion 23a of the magnetic pole position detecting sensor side cover 23 arranged in the control unit case (mold case) 21. A blind hole 27a having a closed bottom is disposed in the center of the waterproofing plug 27.

According to the fourth embodiment, the configuration is as described above. Since the waterproofing plug 27 is made of rubber and is warped during the assembling, the insertion property is poor. However, it is possible to easily insert the pin to the blind hole 27a disposed in the center for the assembling, thereby enabling improved assembling workability.

Fifth Embodiment

Figure 13:
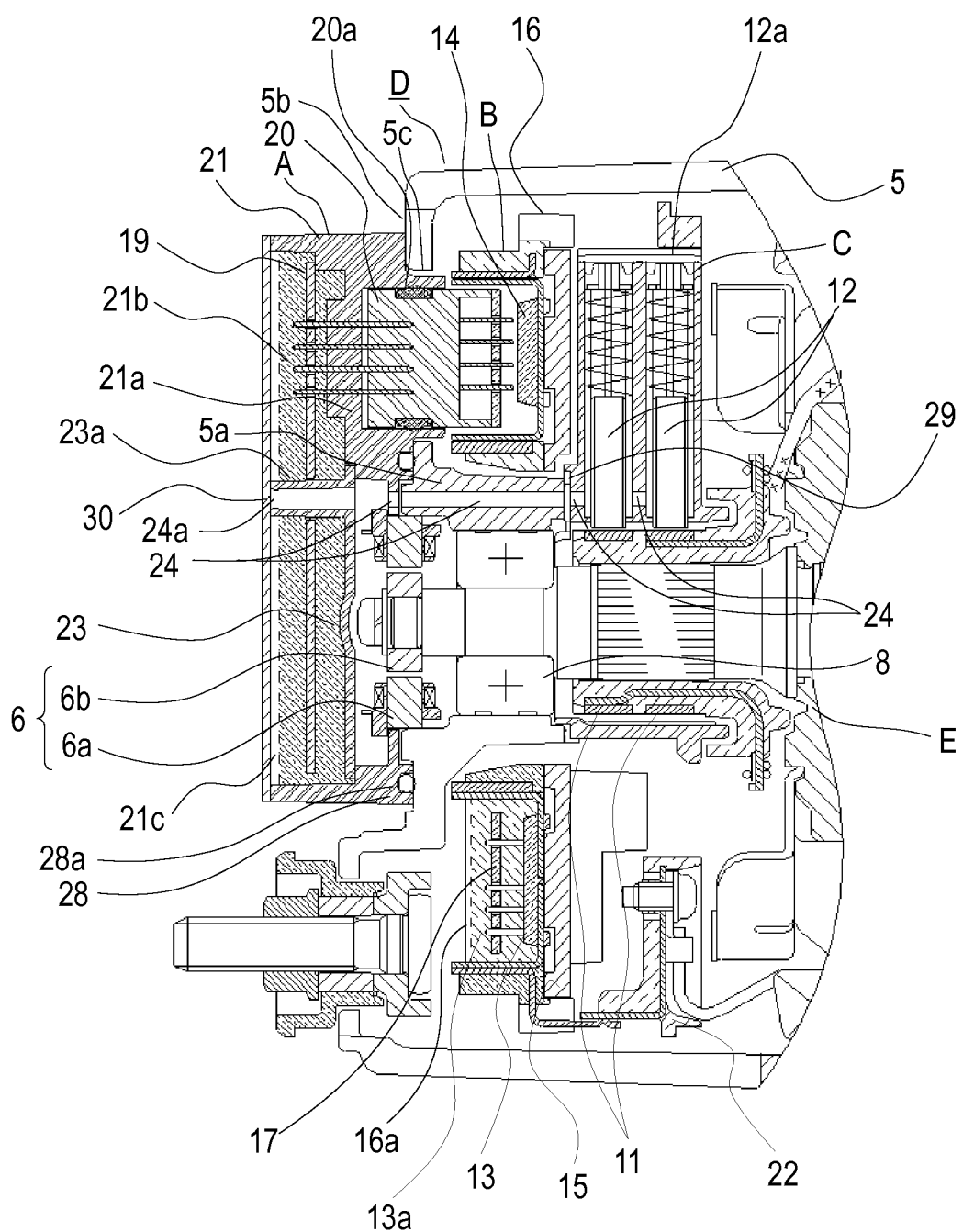
FIG. 13 illustrates a fifth embodiment of the present invention, and is a cross-sectional view illustrating a main portion of a controller-integrated electric rotating machine.

Hereinafter, a fifth embodiment will be described with reference to FIG. 13. FIG. 13 is a cross-sectional view illustrating a main portion of a controller-integrated electric rotating machine. However, the same reference numerals are given to the configuring elements similar to the first embodiment, and since the basic configurations are the same as those of the first embodiment, the description will be omitted.

A rear cover with seal 30 is disposed in a rear portion of the control unit case (mold case) 21. By completely and entirely covering a resin portion 21c of the control unit case (mold case) 21, it is possible to reliably waterproof the control board 19 inside the control unit assembly A, and it is possible to reliably prevent water from permeating through the rear side opening of the through-hole 24 of the cylindrical portion 23a. When assembling the controller-integrated electric rotating machine, the rear cover with seal 30 may be installed after the brush restricting pin is removed from the through-hole 24 of the cylindrical portion 23a. In disassembling, the rear cover with seal 30 may be detached and the brush restricting pin may be inserted to the through-hole 24 of the cylindrical portion 23a.

Sixth Embodiment

Figure 14A:
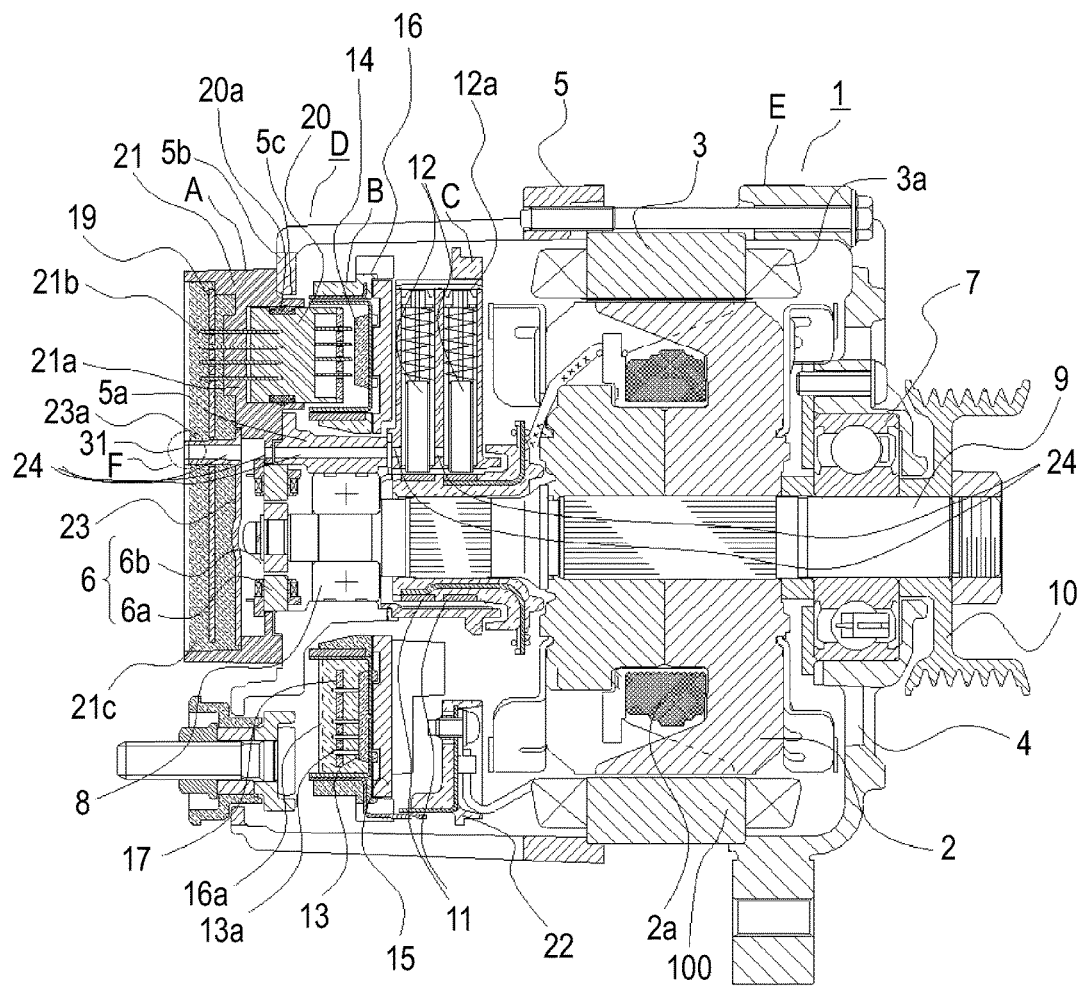
FIGS. 14(a) to (c) illustrate a sixth embodiment of the present invention.
Figure 14B:
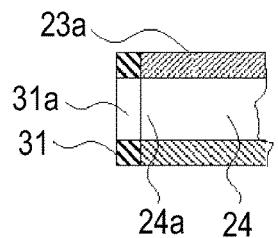
Figure 14C:
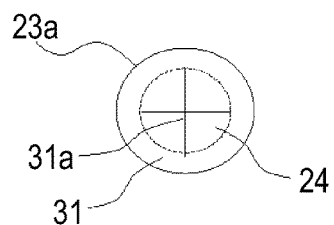

Hereinafter, a sixth embodiment of the present invention will be described with reference to FIG. 14. FIG. 14(a) is a cross-sectional view illustrating an overall structure of a controller-integrated electric rotating machine, FIG. 14(b) is a cross-sectional view illustrating an enlarged F portion in FIG. 14(a), and FIG. 14(c) is a view where the F portion in FIG. 14(b) is viewed from the rear side. However, the same reference numerals are given to the configuring elements similar to the first embodiment, and since the basic configurations are the same as those of the first embodiment, the description will be omitted.

A waterproofing lid 31 whose hole is closed if the brush restricting pin is removed by passing therethrough is attached to the rear side end surface of the cylindrical portion 23a by using fixing means such as bonding. The waterproofing lid 31 is formed of an elastic material such as rubber, and a cruciate slit 31a is disposed in a central portion thereof.

If the brush restricting pin passes through the center of the cruciate slit 31a, a hole is opened in the central portion of the cruciate slit 31a. If the brush restricting pin is removed, the opened hole is closed by a reaction force of the waterproofing lid 31 itself.

According to the sixth embodiment, since the configuration is as described above, it is possible to prevent water from permeating through the rear side opening 24a of the through-hole 24 of the cylindrical portion 23a easily and at low cost.

The packing 29 in the fifth embodiment described above may also have the same shape as the waterproofing lid 31 in the sixth embodiment.

Seventh Embodiment

Hereinafter, a seventh embodiment of the present invention will be described with reference to FIGS. 15 and 16.

Figure 15:
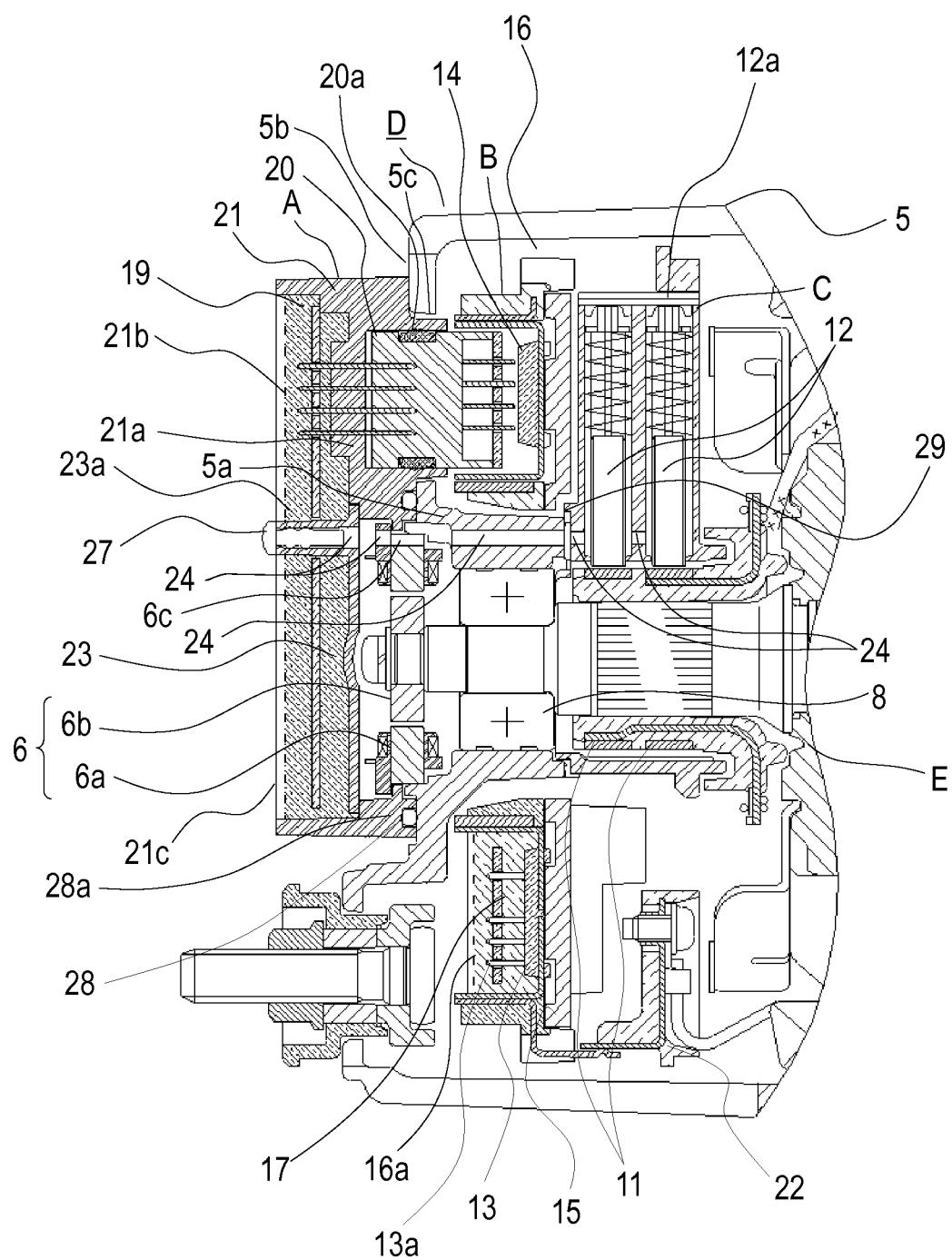
FIG. 15 illustrates a seventh embodiment of the present invention, and is a cross-sectional view of a main portion of a controller-integrated electric rotating machine.
Figure 16:
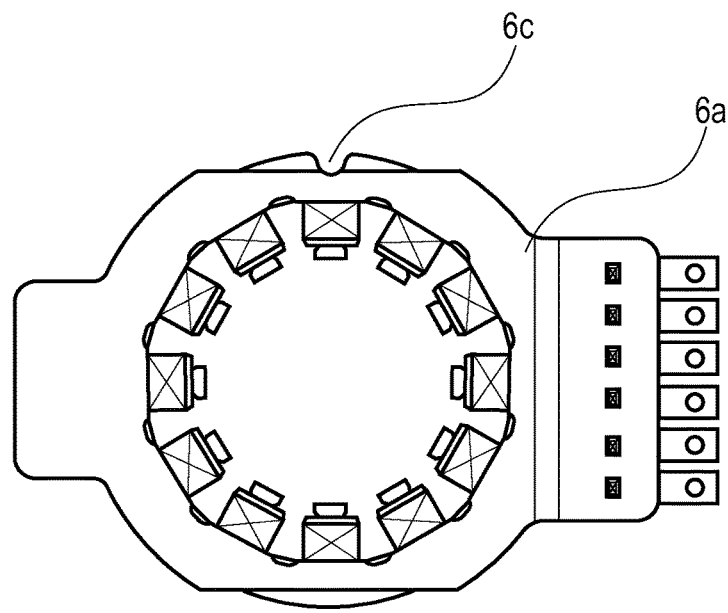
FIG. 16 illustrates the seventh embodiment of the present invention, and is a view where a magnetic pole position detecting sensor in FIG. 11 is viewed from the rear side in a controller-integrated electric rotating machine.

FIG. 15 is a cross-sectional view illustrating a main portion of a controller-integrated electric rotating machine. FIG. 16 is a view where the magnetic pole position detecting sensor in FIG. 15 is viewed from the rear side. However, the same reference numerals are given to the configuring elements similar to the first embodiment, and since the basic configurations are the same as those of the first embodiment, the description will be omitted.

The sensor stator 6a attached to a driver case 25 has a larger outer diameter than a position of the brush restricting pin insertion hole 24. In order to insert the brush restricting pin, a notched portion 6c is disposed in an outer peripheral portion of a core of the sensor stator 6a, and the through-hole 24 is also disposed in a core holding member.

According to the seventh embodiment, the configuration is as described above.

Therefore, it is possible to increase the diameter of the sensor in order to improve the angle detection accuracy of the magnetic pole position detecting sensor, thereby enabling improved productivity.

Eighth Embodiment

Figure 17:
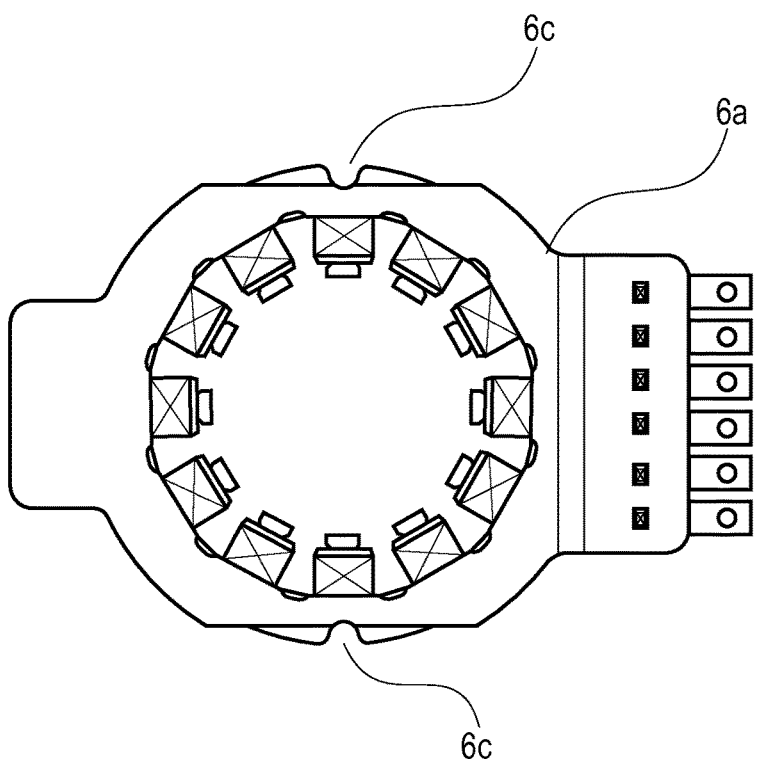
FIG. 17 illustrates an eighth embodiment of the present invention, and is a view where a magnetic pole position detecting sensor is viewed from the rear side in a controller-integrated electric rotating machine.

Hereinafter, an eighth embodiment will be described with reference to FIG. 17. FIG. 17 is a view where the magnetic pole position detecting sensor is viewed from the rear side in a controller-integrated electric rotating machine.

In the seventh embodiment described above, the notched portion 6c of the sensor stator 6a and the through-hole 24 are disposed in only one place. However, in the eighth embodiment, the notched portion 6c of the sensor stator 6a or the through-hole is disposed at positions symmetrical to the rotary shaft 9, in two or more places in the circumferential direction.

According to the eighth embodiment, the configuration is as described above. Two or more of the notched portions 6c or two or more of the through-holes which are present in the circumferential direction are disposed at positions symmetrical to the rotary shaft 9. Therefore, a magnetic circuit of the magnetic pole position detecting angle sensor 6 is less influenced, thereby enabling improved detection angle accuracy.

In the related art disclosed in PTL 1, after the power circuit unit is assembled with the rear bracket, the control unit case (mold case) is configured to be assembled. Accordingly, there is a positional deviation between two fitted places of the connector portion disposed in the control unit case (mold case) and the sensor stator mounted on the control unit case (mold case). Thus, the eccentricity of the connectors occurs, thereby causing poor waterproofing property. However, according to the first to eighth embodiments, the control unit assembly A, the power unit assembly B and the brush unit assembly C which are attached to the rear bracket 5 are configured to include the series of brush restricting pin insertion holes 24 for pressing and holding the brush, through which the brush restricting pin passes. Therefore, after the sensor stator 6a which is first attached to the control unit assembly A is fitted to the rear bracket 5, the power unit assembly B can be assembled therewith. In this manner, the eccentricity is eliminated between the connector disposed in the control unit assembly A and the connector disposed in the power unit assembly B, thereby improving the waterproofing property of the connectors.

In each drawing of FIGS. 1 to 18, the same reference numerals indicate the same or corresponding portions.

REFERENCE SIGNS LIST

A control unit assembly
As fastener
B power unit assembly
Bs fastener
C brush unit assembly
Cs fastener
D rear side semi-manufactured assembly (non-load semi-manufactured assembly)
Des fastener
E front side semi-manufactured assembly (load semi-manufactured assembly)
1 controller-integrated electric rotating machine
2 rotor
2a field winding (rotor winding)
2f cooling fan
3 stator
3a three-phase stator winding (armature winding)
4 front bracket (load side bracket)
5 rear bracket (non-load side bracket)
5a boss portion
5b rear bracket end plate portion
5c connector through-hole
6 magnetic pole position detecting sensor
6a sensor stator
6b sensor rotor
6c notched portion
7 front side bearing (load side bearing)
8 rear side bearing (non-load side bearing)
9 rotary shaft
10 pulley
11 slip ring
12 brush
12a brush holder
12b brush pressing spring
13 power circuit
13a power circuit signal terminal
13Inv power circuit unit
14 rotor energizing control unit (field winding)
14a rotor energizing control unit signal terminal
15 heat sink
16 power unit case
16a resin (resin mold)
17 relay board
18 electronic module
19 control board
20 F connector (female connector of power unit assembly B side)
20a packing
21 control unit case (mold case)
21a M connector (male connector of control unit assembly A side)
21b terminal (control unit assembly side terminal)
21c resin (mold)
22 wiring member
22a inserted component
22b inserted component
23 magnetic pole position detecting sensor side cover
23a cylindrical portion
24 series of brush restricting pin insertion holes
24a rear side opening (non-load side opening) of series of brush restricting pin insertion holes
24p brush restricting pin
26 brush disengagement prevention unit
27 waterproofing plug
27a blind hole
28 O-ring
28a groove
29 packing
30 rear cover (non-road side cover)

31 waterproofing lid
31a cruciate slit
100 electric rotating machine main body

The invention claimed is:

1. A controller-integrated electric rotating machine comprising: a rotor that is held by a rear bracket and a front bracket and located concentrically with a stator; a brush unit assembly that is an assembly of a brush energizing the rotor and a brush holder holding the brush; a power unit assembly configured so that at least any one of a rotor energizing control unit which performs an energizing control of the rotor by being controlled and a power circuit unit which performs an energizing control of the stator by being controlled is attached to a power unit case; and a control unit assembly configured so that a control board that mounts a control circuit performing the controls on the rotor energizing control unit and the power circuit unit by outputting a control signal to the rotor energizing control unit and the power circuit unit is attached to a control unit case, wherein the control unit assembly is located at a rearmost side, the brush unit assembly is located at a front most side, and the power unit assembly is located between the control unit assembly and the brush unit assembly, respectively, and the control unit assembly, the brush unit assembly and the power unit assembly are incorporated in the rear bracket, and the rear bracket, the control unit assembly, the power unit assembly and the brush unit assembly are integrated to configure a rear side semi-manufactured assembly, the controller-integrated electric rotating machine is configured so that a front side semi-manufactured assembly formed from the rotor and the front bracket, and the rear side semi-manufactured assembly are assembled, and a series of brush restricting pin insertion holes are disposed in-line from a rear side end surface of the control unit assembly through each of the control unit assembly, the rear bracket, the power unit assembly, and the brush unit assembly respectively.

2. The controller-integrated electric rotating machine according to claim 1, wherein
a waterproofing lid which opens a hole if a brush restricting pin passes through the hole and closes the opened hole if the passed brush restricting pin is removed is attached to a rear end side of the brush restricting pin insertion hole of the control unit assembly.

3. The controller-integrated electric rotating machine according to claim 1, wherein
the control board of the control unit assembly is molded with resins, and a rear cover which covers the entire surface of the molded rear side surface and covers a rear side opening of the brush restricting pin insertion hole of the control unit assembly is disposed.

4. The controller-integrated electric rotating machine according to claim 1, wherein
the brush holder is attached to the rear bracket after the power unit assembly is attached to the rear bracket.

5. The controller-integrated electric rotating machine according to claim 1, wherein
a waterproofing plug for closing the brush restricting pin insertion hole of the control unit assembly is inserted from a rear side end surface of the brush restricting pin insertion hole of the control unit assembly.

6. The controller-integrated electric rotating machine according to claim 5, wherein
a blind hole which has a closed bottom and is open to a rear side end surface of the waterproofing plug is disposed in a center portion of the waterproofing plug.

7. The controller-integrated electric rotating machine according to claim 1, wherein
a boss portion surrounded by the power unit assembly is disposed in the rear bracket, and the brush restricting pin insertion hole is disposed in the boss portion.

8. The controller-integrated electric rotating machine according to claim 7, wherein
a front side end portion of a rotary shaft of the rotor is supported by a front side bearing which is attached to the front bracket, and a rear side end portion of the rotary shaft is supported by a rear side bearing which is attached to an inner periphery of the boss portion.

9. The controller-integrated electric rotating machine according to claim 8, wherein
a sensor rotor of a magnetic pole position detecting sensor is attached to a further rear side end portion than the rear side bearing of the rotary shaft.

10. The controller-integrated electric rotating machine according to claim 9, wherein
a sensor stator of the magnetic pole position detecting sensor is attached to the control unit case.

11. The controller-integrated electric rotating machine according to claim 10, wherein
a notched portion forming a portion of the brush restricting pin insertion hole or a through-hole is disposed on an outer peripheral surface of the sensor stator.

12. The controller-integrated electric rotating machine according to claim 11, wherein
a plurality of the notched portions or the through-holes are disposed at symmetrical positions around a center of the sensor rotor.

13. The controller-integrated electric rotating machine according to claim 9, wherein
a brush disengagement prevention unit is disposed between the sensor rotor and the rear side bearing.

14. The controller-integrated electric rotating machine according to claim 13, wherein
a sensor stator of the magnetic pole position detecting sensor is attached to the control unit case.

15. The controller-integrated electric rotating machine according to claim 14, wherein
a notched portion forming a portion of the brush restricting pin insertion hole or a through-hole is disposed on an outer peripheral surface of the sensor stator.

16. The controller-integrated electric rotating machine according to claim 15, wherein
a plurality of the notched portions or the through-holes are disposed at symmetrical positions around a center of the sensor rotor.

* * * * *